US011533287B2

(12) United States Patent
Nair et al.

(10) Patent No.: US 11,533,287 B2
(45) Date of Patent: Dec. 20, 2022

(54) MID-TIER MESSAGING SYSTEM

(71) Applicant: PAYPAL, INC., San Jose, CA (US)

(72) Inventors: Rahul Nair, Leander, TX (US); Swati Baradia, San Jose, CA (US); Liang Xi, Elkhorn, NE (US); Ramakrishna Rosanuru, Chennai (IN); Billy Henry Runyan, San Jose, CA (US); Linu Varghese, Cedar Park, TX (US); Koteswara Pathuri, Georgetown, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/165,871

(22) Filed: Feb. 2, 2021

(65) Prior Publication Data

US 2021/0160210 A1      May 27, 2021

Related U.S. Application Data

(63) Continuation of application No. 16/022,073, filed on Jun. 28, 2018, now Pat. No. 10,911,396.

(51) Int. Cl.
*G06F 15/16* (2006.01)
*H04L 51/56* (2022.01)
(Continued)

(52) U.S. Cl.
CPC ............ *H04L 51/56* (2022.05); *G06F 40/30* (2020.01); *H04L 63/08* (2013.01); *H04L 67/148* (2013.01); *H04W 12/06* (2013.01); *H04L 51/02* (2013.01)

(58) Field of Classification Search
CPC ....... H04L 51/36; H04L 63/08; H04L 67/148; H04L 51/02; H04W 12/06; G06F 40/30
(Continued)

(56) References Cited

U.S. PATENT DOCUMENTS 8,401,009 B1    3/2013  Dorsey et al.
9,967,260 B1 *  5/2018  Gabriel ................ H04W 12/06
(Continued)

FOREIGN PATENT DOCUMENTS

EP      1495413 B1    2/2009

OTHER PUBLICATIONS

European Application No. 19825633.1, Extended European Search Report dated Jul. 20, 2021, 8 pages.
(Continued)

*Primary Examiner* — Suraj M Joshi
*Assistant Examiner* — Joel Mesa
(74) *Attorney, Agent, or Firm* — Haynes and Boone, LLP

(57) ABSTRACT

A mid-tier messaging system receives a request to initiate a communication session via a first messaging channel that includes a first messaging interface of a first messaging application provided at a user device and a first message provider of a plurality of message providers. The mid-tier messaging system establishes a first session that is mapped to the communication session. The mid-tier messaging system establishes the communication, using the first session, between the first messaging interface and the first message provider. The mid-tier messaging system provides, through the first session, first message communications between the first message provider and the first messaging interface. The mid-tier messaging system seamlessly switches to a second message provider service when the first message provider service cannot service an intent of the first communication session.

20 Claims, 14 Drawing Sheets

(51) Int. Cl.
  *H04L 67/148*   (2022.01)
  *H04L 9/40*     (2022.01)
  *H04W 12/06*    (2021.01)
  *G06F 40/30*    (2020.01)
  *H04L 51/02*    (2022.01)

(58) Field of Classification Search
  USPC .......................................................... 709/206
  See application file for complete search history.

(56) References Cited

U.S. PATENT DOCUMENTS

| | | |
|---|---|---|
| 2010/0317376 A1 | 12/2010 | Anisimov et al. |
| 2013/0132592 A1* | 5/2013 | Rothschild ............ H04W 76/16 |
| | | 709/228 |
| 2016/0149760 A1 | 5/2016 | Voit et al. |
| 2017/0244663 A1 | 8/2017 | Ku et al. |
| 2019/0102078 A1* | 4/2019 | Bhatt .................... G06F 3/0481 |

OTHER PUBLICATIONS

International Application No. PCT/US2019/039627, International Preliminary Report on Patentability dated Jan. 7, 2021, 9 pages.
International Application No. PCT/US2019/039627, International Search Report and Written Opinion dated Sep. 20, 2019, 9 pages.

* cited by examiner

MID-TIER MESSAGING SYSTEM

RELATED APPLICATIONS

This application is a continuation of U.S. patent application Ser. No. 16/022,073, filed Jun. 28, 2018, issued on Feb. 2, 2021 as U.S. Pat. No. 10,911,396, which is herein incorporated by reference in its entirety.

TECHNICAL FIELD

The present disclosure generally relates to messaging systems and more particular to a mid-tier messaging system that manages message communications between messaging interfaces and message providers.

BACKGROUND

Service providers such as payment service providers, merchants, retailers, and other service providers may provide a customer service system to customers such that customers may inquire or receive support to questions or issues that customers may be experiencing in relation to a product, a service, or a system of the service provider with which the customer is interacting. Customer service systems may include several support platforms including contact centers where a customer may interact with a customer service representative, chat bots, interactive voice response (IVR) systems, and/or a customer service website. Each of these support platforms may have several other channels of interaction between a customer and a customer service representative or other support. For example, through a messaging interface, provided by a customer service web page or application, the customer may interact with one or more message provider services such as artificial intelligence (AI) programs (e.g., a bot) or a live customer service representative, using messaging interfaces such as an instant message platform, email, asynchronous messaging, and/or text messaging. Live customer support is typically preferred in handling customer support. However, contact centers employing customer representatives are expensive to provide, and may become overwhelmed with customer interactions for certain events or times of day, resulting in a lessened customer experience in resolving the customer's issue due to wait times.

Bot platforms may alleviate some of the frequently asked questions or issues that the customer service system is receiving inquiries about from customers and are often initially presented to the customer to determine whether the bot can resolve the issue. However, when the bot cannot resolve the issue, the customer may require a live customer representative that is on another messaging channel and provided by a different message provider service. The customer is required to restart the communication with the customer representative on that messaging channel and the customer often needs to provide all of the information and communications provided to the chat bot again to the live customer service representative.

Furthermore, developers of the customer service system are required to integrate their customer service system with each message provider service separately. For example, each bot and/or live messaging service may require a separate integration. However, if a bot is to be changed, the developer has to reintegrate the customer service system with another message provider service, which is costly in time and resources.

Figure 1:
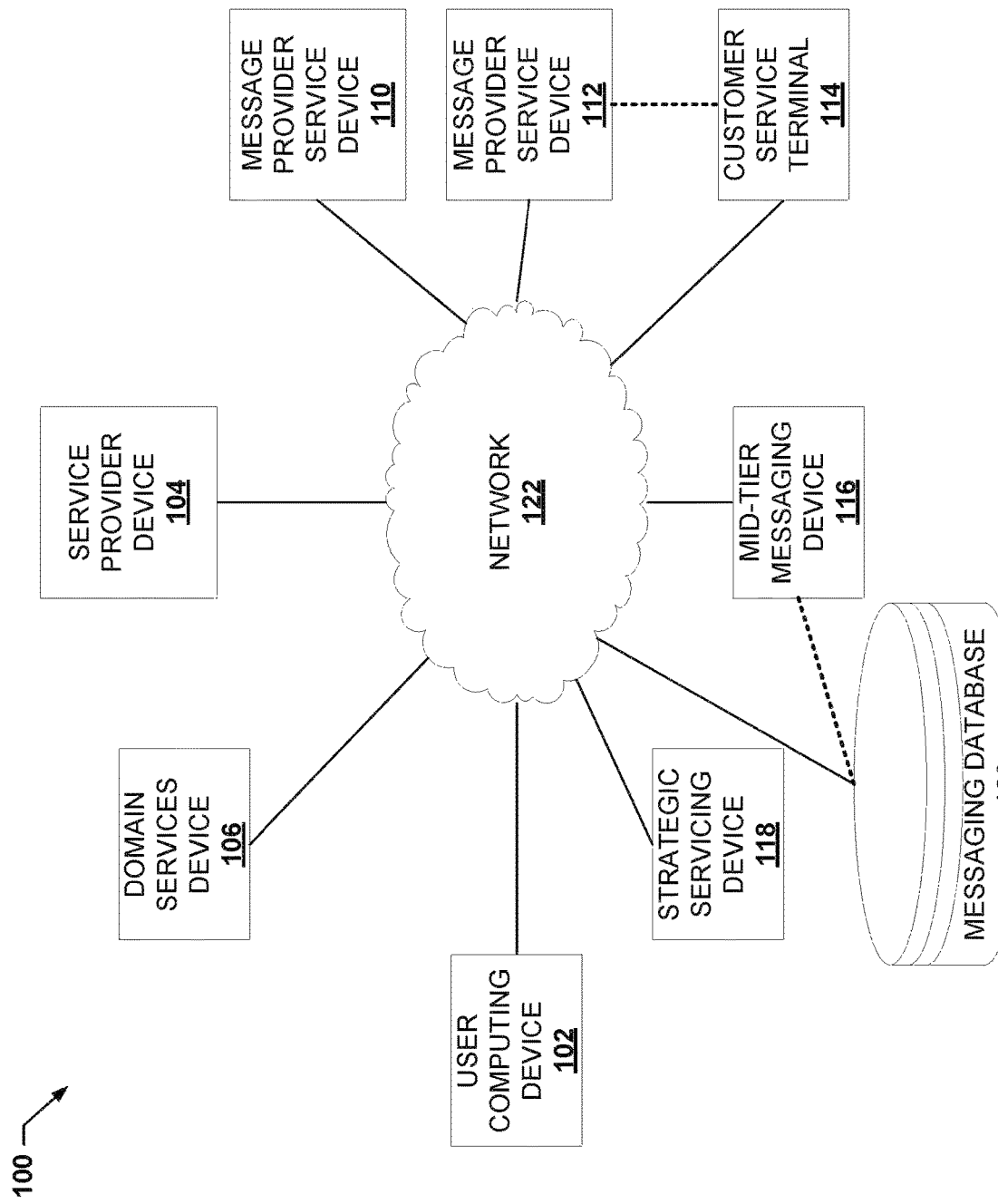
FIG. 1 is a schematic view illustrating an embodiment of the mid-tier messaging system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for a mid-tier messaging system that provides a mid-tier messaging service that facilitates communication over a messaging channel that includes a messaging interface and a message provider service that provide message communications between each other. The mid-tier messaging service may interact with domain services and strategic services such that a channel recommendations may be made to a user recommending which messaging interface and message provider the user should use to establish a communication session to resolve the issue the customer is inquiring about. If the issue cannot be resolved using the first message channel, the mid-tier messaging service will provide a recommendation for a second channel and facilitate the switching of the channels such that the transition is seamless to the user. For example, if a user interacting with a bot message provider and the mid-tier messaging system determines that the user should be interacting with a live message provider, then the mid-tier messaging system may transition the user to interact with the live message provider without exiting from the messaging interface with which the user is interacting. In providing this switching between messaging channel, the mid-tier messaging service may perform cross channel authentication using authentication information that was provided when establishing the first messaging channel. In addition, the mid-tier messaging service may provide the message history of the first message channel to the second message channel such that the message provider and/or the messaging interface has access to the message communications that were provided on the first channel.

Other benefits of the mid-tier messaging system may be recognized by developers of customer support systems. The mid-tier message service, because of its intermediary nature, provides a platform that is easily accessible and configurable with various message providers, service providers, and/or messaging interfaces. The use of application programming interfaces (APIs) allows the mid-tier messaging system to integrate message providers, service providers, messaging interfaces, domain services, and strategic services separately. As such, adding, removing, and updating message providers, service providers, and/or messaging interfaces requires less time and processing resources.

Referring now to FIG. 1, an embodiment of a mid-tier messaging system 100 is illustrated. The mid-tier messaging system 100 includes a user computing device 102, a service provider device 104, a domain services device 106 a message provider service device 110, a message provider service device 112, a customer service terminal 114, a mid-tier messaging device 116, a strategic servicing device 118, and a messaging database 120 in communication of over a network 122. Although only one user computing device 102, service provider device 104, customer service terminal 114, strategic servicing device 118, and domain services device 106 are illustrated as being in communication with the mid-tier messaging device 116, one of skill in the art in possession of the present disclosure would recognize that any number of these devices may be in communication with the mid-tier messaging device 116 over the network 122 while remaining within the scope of the present disclosure. In an embodiment, the user computing device 102 may be provided by a desktop computing system, a laptop/notebook computing system, a tablet computing system, a mobile phone, a landline phone, a wearable computing device and/or other user devices known in the art.

The network 122 may be implemented as a single network or a combination of multiple networks. For example, in various embodiments, the network 122 may include the Internet and/or one or more intranets, landline networks, wireless networks, and/or other appropriate types of networks. The network 122 may include a data network, a public switched telephone network, and/or a converged network on which both data communications and voice communications are transmitted.

The service provider device 104 may include a service provider server that may include multiple servers and computing devices (e.g., desktop computing device(s), laptop/notebook computing device(s), tablet computing device(s), mobile phone(s), etc.) for providing a service to a user through the user computing device 102. For example, the service provider device 104 may provide payment services for facilitating online and/or mobile payments between a retailer/merchant and a consumer. In other examples, the service provider device 104 may be an online retailer system configured to present and sell products to a consumer, a gaming system that provides online gaming to a consumer, a content provider system that provides content such as streaming videos to a consumer, a general consumer support system for an organization, a banking system, a social network system, and/or other systems belonging to organizations that require customer support. The service provider device 104 may include multiple servers and systems for providing the services and/or products related to the service provider's business.

The service provider device 104 may provide a messaging interface to the user computing device 102 via a web application. The messaging interface may be included at the service provider device 104 or may be provided by a separate messaging interface service device that may include multiple servers and computing devices (e.g., desktop computing device(s), laptop/notebook computing device(s), tablet computing device(s), mobile phone(s), etc.) for providing a messaging interface service to a user through the user computing device 102. For example, the messaging interface service may be provided by PayPal, Inc, Facebook Messenger™, WhatsApp™, Twitter™, Amazon Alexa™, short message service (SMS) messaging, e-mail, asynchronous messaging and/or other text messaging services and/or voice to text services that would be apparent to one of skill in the art in possession of the present disclosure.

The mid-tier messaging system 100 may include a plurality of message provider service devices 110 and 112. Each message provider service device 110 and/or 112 may include a message provider service server that may include multiple servers and computing devices (e.g., desktop computing device(s), laptop/notebook computing device(s), tablet computing device(s), mobile phone(s), etc.) for providing a message provider service to a user through the user computing device 102. The message provider service device 110 and/or 112 may include a live chat platform (e.g., a message provider service that allows representative to communicate with the user via the messaging interface), an artificial intelligence (AI) platform (e.g., a bot platform where a computer program is configured to communicate with the user via the messaging interface), an asynchronous messaging platform, an e-mail platform, and/or any other communication platforms voice and/or text that would be apparent to one of skill in the art in possession of the present disclosure. The bot platform may include, for example, IBM Watson™, Inbenta™, Amazon Lex™, Flamingo™, Snaps™, Google Dialogflow™, Microsoft LUIS™, and/or any other bot platform that may be apparent to one of skill in the art in possession of the present disclosure. The live chat platform may include, for example, Genesys™, LivePerson™, LiveChat™, WebChat™, and/or any other live chat platform that would be apparent to one of skill in the art in possession of the present disclosure.

The mid-tier messaging system 100 also includes a customer service terminal 114 from which a customer service representative may help to provide customer service. The customer service terminal may include a telephone for voice communications and/or a computing device for receiving information related to a communication session and displaying information, videos, and/or message communications to a customer service representative. As can be seen in the illustrated embodiment, the customer service terminal 114 is in direct communication with the message provider service device 112. However, it is contemplated that the customer service terminal 114 may be in communication with any of the components of the message provider service devices 110 and 112 through the network 122, and provided via other configurations that are envisioned as falling within the scope of the present disclosure.

The mid-tier messaging system 100 may include a strategic services device 118. The strategic services device 118 may include a strategic services server that may include multiple servers and computing devices (e.g., desktop computing device(s), laptop/notebook computing device(s), tablet computing device(s), mobile phone(s), etc.) for providing a strategic service for the mid-tier messaging system 100. For example, the strategic servicing device 118 may include one or more strategic services that determine intent of a user interacting with the mid-tier messaging system 100, recommend a communication channel to the user, map the user's experience with mid-tier messaging system 100, perform natural language processing, provide mid-tier messaging system information (e.g., hours of operation of a live chat, estimated wait time of a live chat, and/or other information), perform machine learning, and/or any other service discussed below and that would be apparent to one of skill in the art in possession of the present disclosure.

The mid-tier messaging system 100 may include a domain service device 106. The domain service device 106 may include a domain service server that may include multiple servers and computing devices (e.g., desktop computing device(s), laptop/notebook computing device(s), tablet computing device(s), mobile phone(s), etc.) for providing a domain services for the mid-tier messaging system 100. For example, the domain service device 106 may include one or more domain services that include user authentication service, information management services (e.g., Oracle Knowledge Management™), notification services (e.g., universal notification platform (UNP)), and/or other domain service that would be apparent to one of skill in the art in possession of the present disclosure and discussed in more detail below.

The mid-tier messaging system 100 includes a messaging database 120 that may include one or more storage systems that is in communication with the mid-tier messaging system 100 via the network 122 and/or may be provided in conjunction with any of the server devices provided on the mid-tier messaging system 100. In various embodiments, the messaging database 120 may include mid-tier messaging system logs that include error logs about the mid-tier messaging system 100, configurations of messaging channels, user experiences, messaging interaction log (e.g., identifiers, intents, durations, outcomes, etc.), messages of a communication session between a user and message provider service, and/or any other information of the mid-tier messaging system 100 discussed below and/or that would be apparent to one of skill in the art in possession of the present disclosure. Furthermore, the mid-tier messaging system 100 may include third party databases that may be in communication with the mid-tier messaging system 100 through network 122. The third party database may provide third party data such as social media data, third party service provider disruptions, credit bureau data, federal compliance and regulatory data, and other third party data for providing customer service that would be apparent to one of skill in the art in possession of the present disclosure.

The mid-tier messaging system 100 may include a mid-tier messaging device 116. The mid-tier messaging device 116 may include a mid-tier messaging server that may include multiple servers and/or computing devices (e.g., desktop computing device(s), laptop/notebook computing device(s), tablet computing device(s), mobile phone(s), etc.) for providing a mid-tier messaging service to the other devices (e.g., the user computing device 102, the service provider device 104, the message provider service devices 110 and 112, the customer service terminal 114, the strategic service device 118, the messaging database 120, the domain services device 106, and/or any other device that may be used for the methods and systems discussed below. As discussed in more detail below, the mid-tier messaging device 116 may integrate, facilitate, and/or otherwise manage the different components of the mid-tier messaging system such that there is seamless integration of communication channels, different vendors, domain services, strategic services, messaging interfaces, message provider services, and messaging databases and/or other services. The mid-tier messaging device 116 may provide a seamless user experience when establishing a communication session with message provider service devices 110 and 112 and/or provide a platform for developers to easily remove, add, and/or change services provided by the various platforms and vendors that may be included in the mid-tier messaging system 100.

Figure 2:
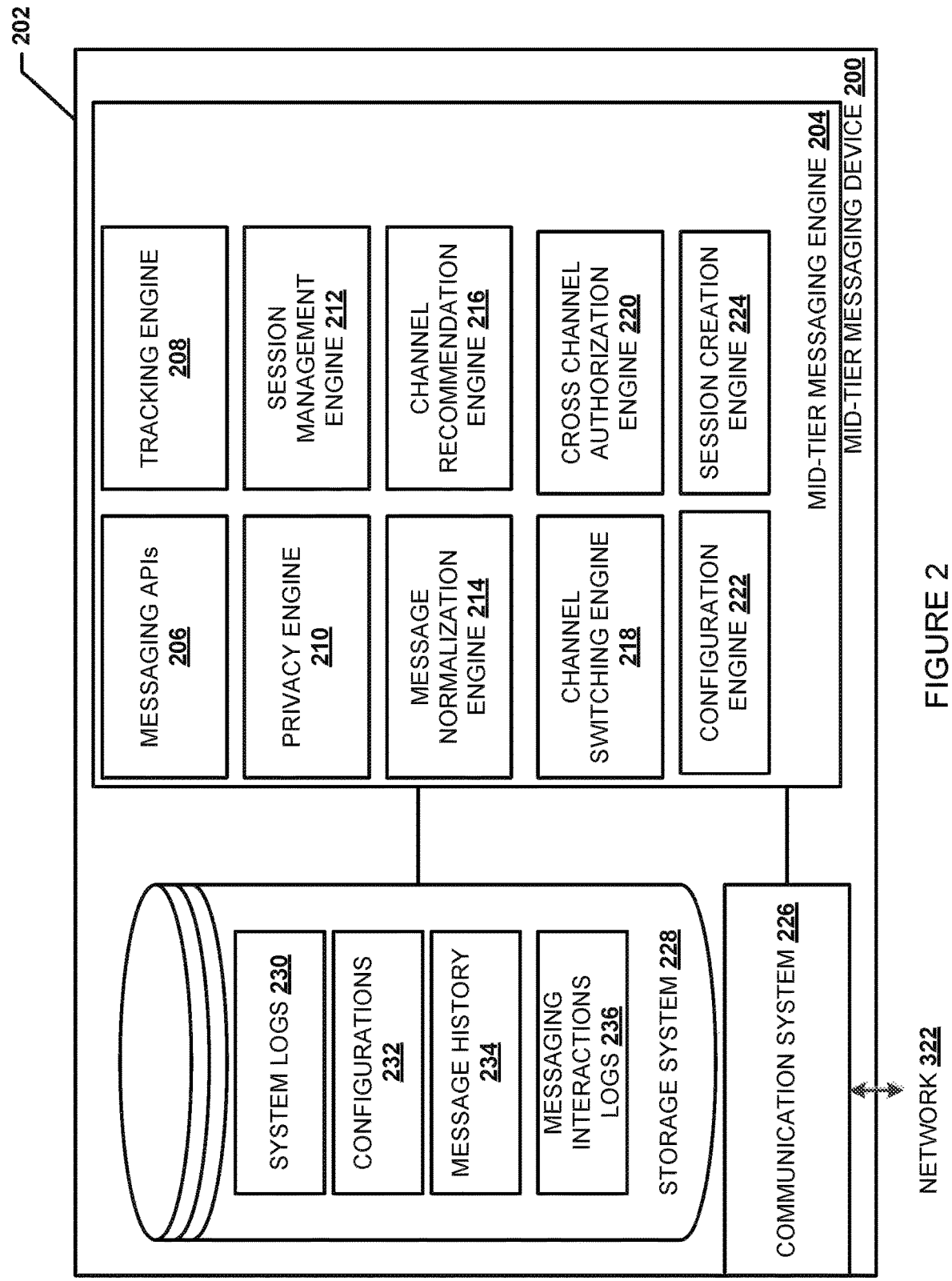
FIG. 2 is a schematic view illustrating an embodiment of a mid-tier messaging device of the mid-tier messaging system of FIG. 1.

Referring now to FIG. 2, an embodiment of a mid-tier messaging device 200 is illustrated. In an embodiment, the mid-tier messaging device 200 may be the mid-tier messaging device 116, discussed above. In the illustrated embodiment, the mid-tier messaging device 200 includes a chassis 202 that houses the components of the mid-tier messaging device 200, only some of which are illustrated in FIG. 2. For example, the chassis 202 may house a processing system (not illustrated) and a non-transitory memory system (not illustrated) that includes instructions that, when executed by the processing system, cause the processing system to provide a mid-tier messaging engine 204 that is configured to perform the functions of the mid-tier messaging engine 204 and/or the mid-tier messaging device 200 discussed below. In a specific example, the mid-tier messaging engine 204 may be software or instructions stored on a computer-readable medium that provides a plurality of messaging application program interfaces (APIs) 206 to provide such as, for example, a tracking engine 208, a privacy engine 210, a session management engine 212, a message normalization engine 214, a channel recommendation engine 216, a channel switching engine 218, a cross channel authorization engine 220, a configuration engine 222, a session creation engine 224, and/or provide any of the other functionality that is discussed below.

The chassis 202 may further house a communication system 226 that is coupled to the mid-tier messaging engine 204 (e.g., via a coupling between the communication system 226 and the processing system) and configured to provide for communication through the network 222 as detailed below. The communication system 226 may be provided by a network Interface Controller (NIC), a wireless communication subsystem (e.g., a WiFi communication subsystem, A BLUETOOTH communication subsystem, a Near Field communication (NFC) subsystem, and/or other wireless communication subsystems known in the art), and/or any other communication components that would be apparent to one of skill in the art in possession of the present disclosure. The chassis 202 may also house a storage system 228 that is coupled to the mid-tier messaging engine 204 through the processing system. The storage system 228 may include all or a portion of the messaging database 120 of FIG. 1 and may store system logs 230, configurations 232, message history 234, messaging interactions log 236, and/or any other data and/or instructions that would be apparent to one of skill in the art in possession of the present disclosure. While the storage system 228 has been illustrated as housed in the chassis 202 of the mid-tier messaging device 200, one of skill in the art will recognize that it may be connected to the mid-tier messaging engine 204 through the network 122 without departing from the scope of the present disclosure. While a specific mid-tier messaging device 200 has been illustrated and described, one of skill in the art in possession of the present disclosure will recognize that mid-tier messaging devices may include other components and/or component configurations for performing conventional functionality, as well as the functionality discussed below, while remaining within the scope of the present disclosure.

Figure 3:
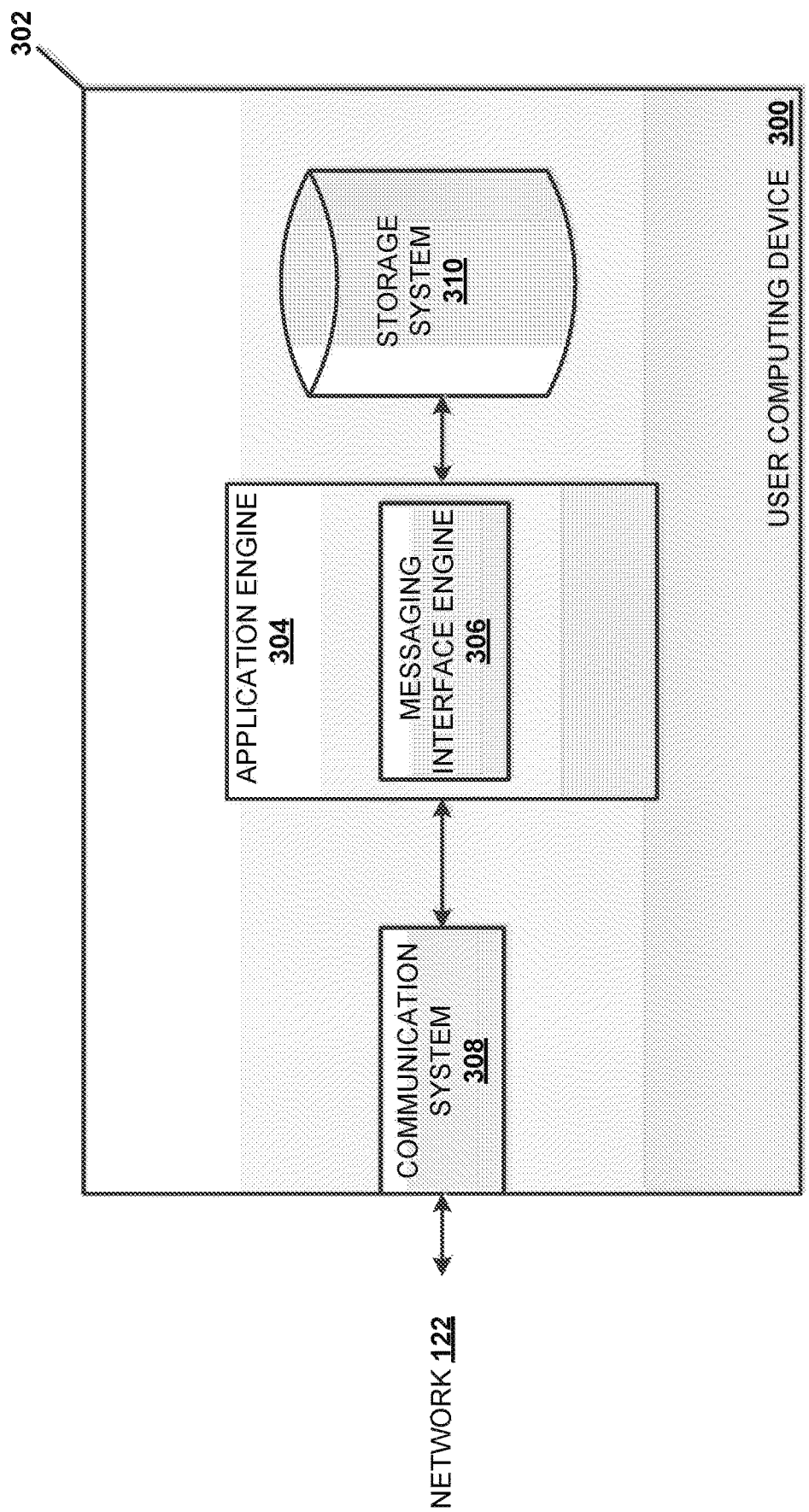
FIG. 3 is a schematic view illustrating an embodiment of a user computing device of the mid-tier messaging system of FIG. 1.

Referring now to FIG. 3, an embodiment of a user computing device 300 is illustrated that, in some embodiments, may be the user computing device 102 discussed above. As such, in some examples the user computing device 300 may be provided by one or more user computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the user computing device 300 includes a chassis 302 that houses the components of the user computing device 300, only some of which are illustrated in FIG. 3. For example, the chassis 302 may house a processing system (not illustrated) and a non-transitory memory system (not illustrated) that includes instructions that, when executed by the processing system, cause the processing system to provide an application engine 304 that is configured to perform the functions of the application engines and user computing devices discussed below according to the method 900. For example, the application engine 304 may include a web browser and/or a native application that can access a service provided by a service provider device, as well as provide any of the other functions of the application engines discussed below. The application engine 304 may also include a messaging interface engine 306 that is configured to provide a messaging interface to the user computing device 300, as well as perform any of the other functions of the messaging interface engine discussed below.

The chassis 302 may further house a communication system 308 that is coupled to the application engine 304 (e.g., via a coupling between the communication system 308 and the processing system) and configured to provide for communication through the network 122 as detailed below. The communication system 308 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 302 may also house a storage system 310 that is coupled to the application engine through the processing system. The storage system 310 may store rules, settings, and/or other data utilized by the application engine 304 and/or the messaging interface engine 306 to provide the functionality discussed below. While the storage system 310 has been illustrated as housed in the chassis 302 of the user computing device 300, one of skill in the art will recognize that it may be connected to application engine 304 through the network 122 without departing from the scope of the present disclosure. While a specific user computing device 300 has been illustrated and described, one of skill in the art in possession of the present disclosure will recognize that user computing devices may include other components and/or component configurations for performing conventional functionality, as well as the functionality discussed below, while remaining within the scope of the present disclosure.

Figure 4:
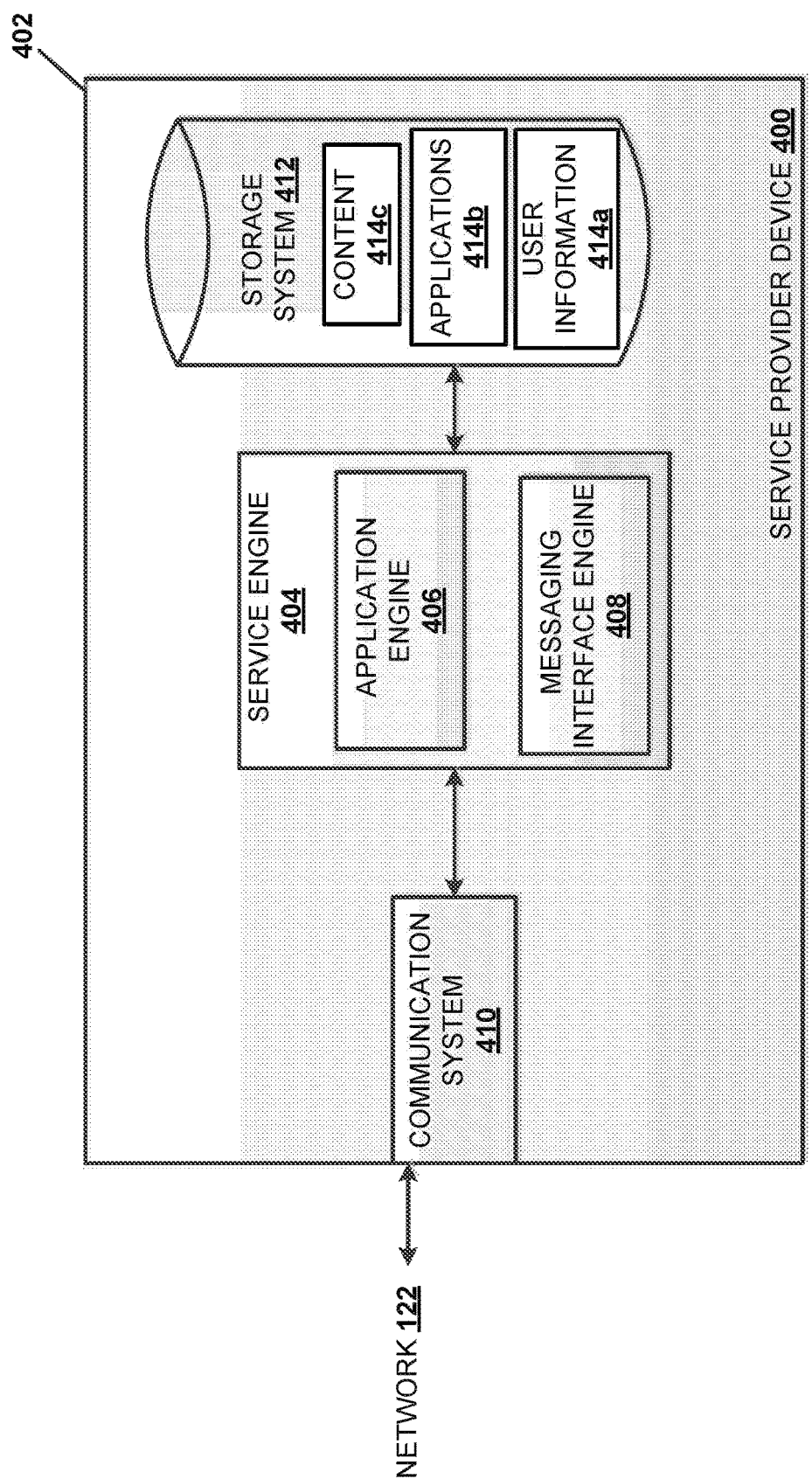
FIG. 4 is a schematic view illustrating an embodiment of a service provider device of the mid-tier messaging system of FIG. 1.

Referring now to FIG. 4, an embodiment of a service provider device 400 is illustrated that, in some embodiments, may be the service provider device 104 discussed above. As such, in some examples the service provider device 400 may be provided by one or more server devices. However, one of skill in the art in possession of the present disclosure will recognize that the service provider device 400 may be provided by any of a variety of computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the service provider device 400 includes a chassis 402 that houses the components of the service provider device 400, only some of which are illustrated in FIG. 4. For example, the chassis 402 may house a processing system (not illustrated) and a non-transitory memory system (not illustrated) that includes instructions that, when executed by the processing system, cause the processing system to provide a service engine 404 that is configured to perform the functions of the service engines and service provider devices discussed below according to the method 900. For example, the service engine 404 may include an application engine 406 that is configured to provide applications, webpages, and other service applications to a user device, as well as provide any of the other functions of the application engines discussed below. The service engine 404 may also include a messaging interface engine 408 that is configured to provide a messaging interface to the user computing device 102, as well as perform any of the other functions of the messaging interface engine discussed below.

The chassis 402 may also house a communication system 410 that is coupled to the service engine 404 (e.g., via a coupling between the communication system 410 and the processing system) and that is configured to provide for communication through the network 122 as detailed below. In the illustrated embodiment, the service provider device 400 also includes a storage device 412 with a database that stores user information 414a, application(s) 414b, content 414c, as well as any of the other information utilized to provide the functionality discussed in further detail below. While the service provider device 400 is illustrated as including a chassis 402 that houses the storage device 412, one of skill in the art in possession of the present disclosure will recognize that the storage device 412 may be provided in a different device/chassis than the service provider device 400 (e.g., a network attached storage device and/or any other device or storage system known in the art) while remaining within the scope of the present disclosure. While a specific service provider device 400 has been illustrated and described, one of skill in the art in possession of the present disclosure will recognize that service provider devices may include other components and/or component configurations for performing conventional functionality, as well as the functionality discussed below, while remaining within the scope of the present disclosure.

Figure 5:
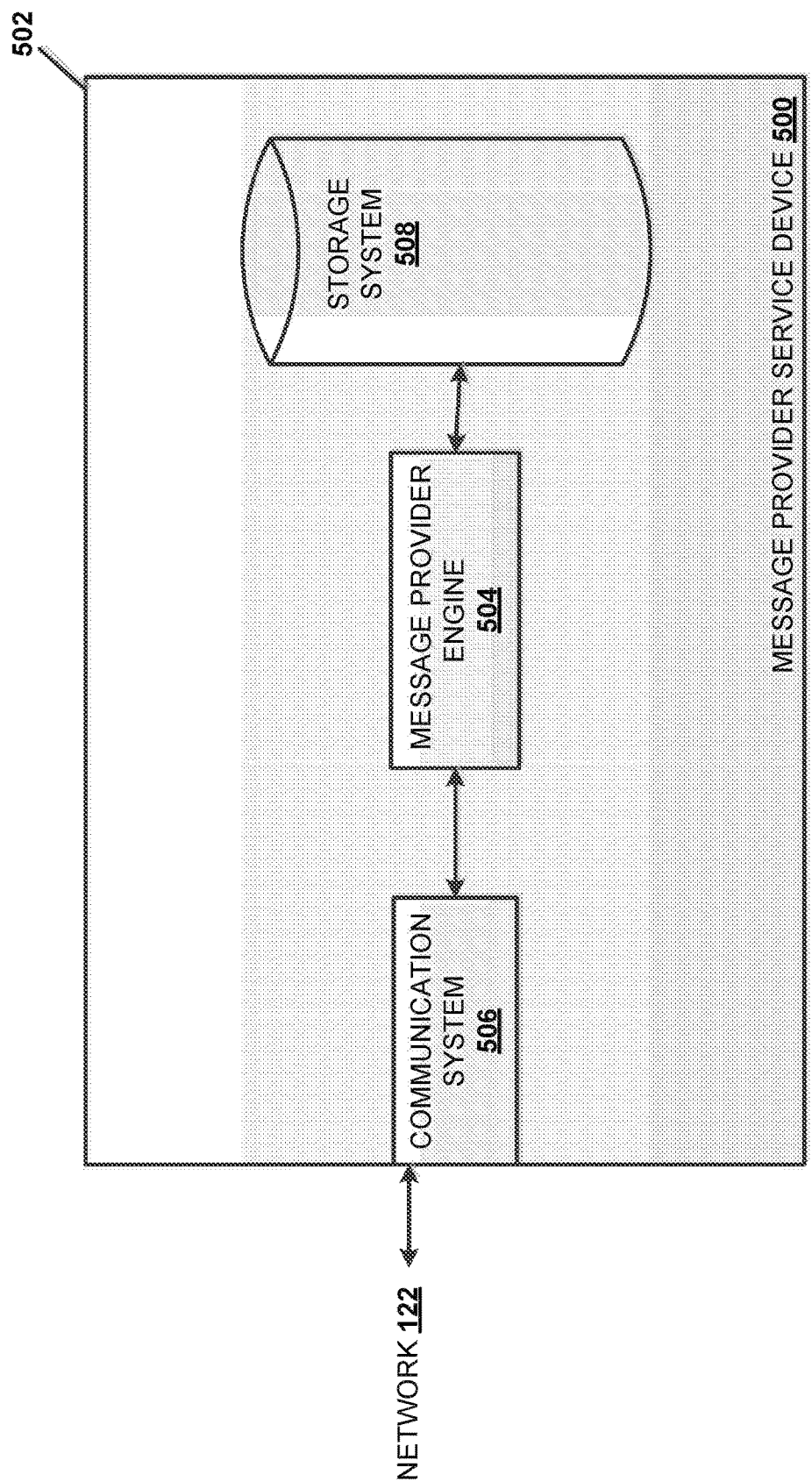
FIG. 5 is a schematic view illustrating an embodiment of a message provider service device of the mid-tier messaging system of FIG. 1.

Referring now to FIG. 5, an embodiment of a message provider service device 500 is illustrated that, in some embodiments, may be the message provider service device(s) 110 or 112 discussed above. As such, in some examples the message provider service device 500 may be provided by one or more server devices. However, one of skill in the art in possession of the present disclosure will recognize that the message provider service device 500 may be provided by any of a variety of computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the message provider service device 500 includes a chassis 502 that houses the components of the message provider service device 500, only some of which are illustrated in FIG. 5. For example, the chassis 502 may house a processing system (not illustrated) and a non-transitory memory system (not illustrated) that includes instructions that, when executed by the processing system, cause the processing system to provide a message provider engine 504 that is configured to perform the functions of the message provider engines and the message provider service devices discussed below according to the method 900. For example, the message provider engine 504 may provide a live chat platform, a bot platform, an asynchronous messaging platform, an e-mail platform, and/or any other communication platforms voice and/or text that would be apparent to one of skill in the art in possession of the present disclosure, as well as provide any of the other functions of the message provider engines discussed below.

The chassis 502 may further house a communication system 506 that is coupled to the message provider engine 504 (e.g., via a coupling between the communication system 506 and the processing system) and configured to provide for communication through the network 122 as detailed below. The communication system 506 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 502 may also house a storage system 508 that is coupled to the application engine through the processing system. The storage system 508 may store rules, settings, and/or other data utilized by the message provider engine 504 to provide the functionality discussed below. While the storage system 508 has been illustrated as housed in the chassis 502 of the message provider service device 500, one of skill in the art will recognize that it may be connected to message provider engine 504 through the network 122 without departing from the scope of the present disclosure. While a specific message provider service device 500 has been illustrated and described, one of skill in the art in possession of the present disclosure will recognize that message provider service devices may include other components and/or component configurations for performing conventional functionality, as well as the functionality discussed below, while remaining within the scope of the present disclosure.

Figure 6:
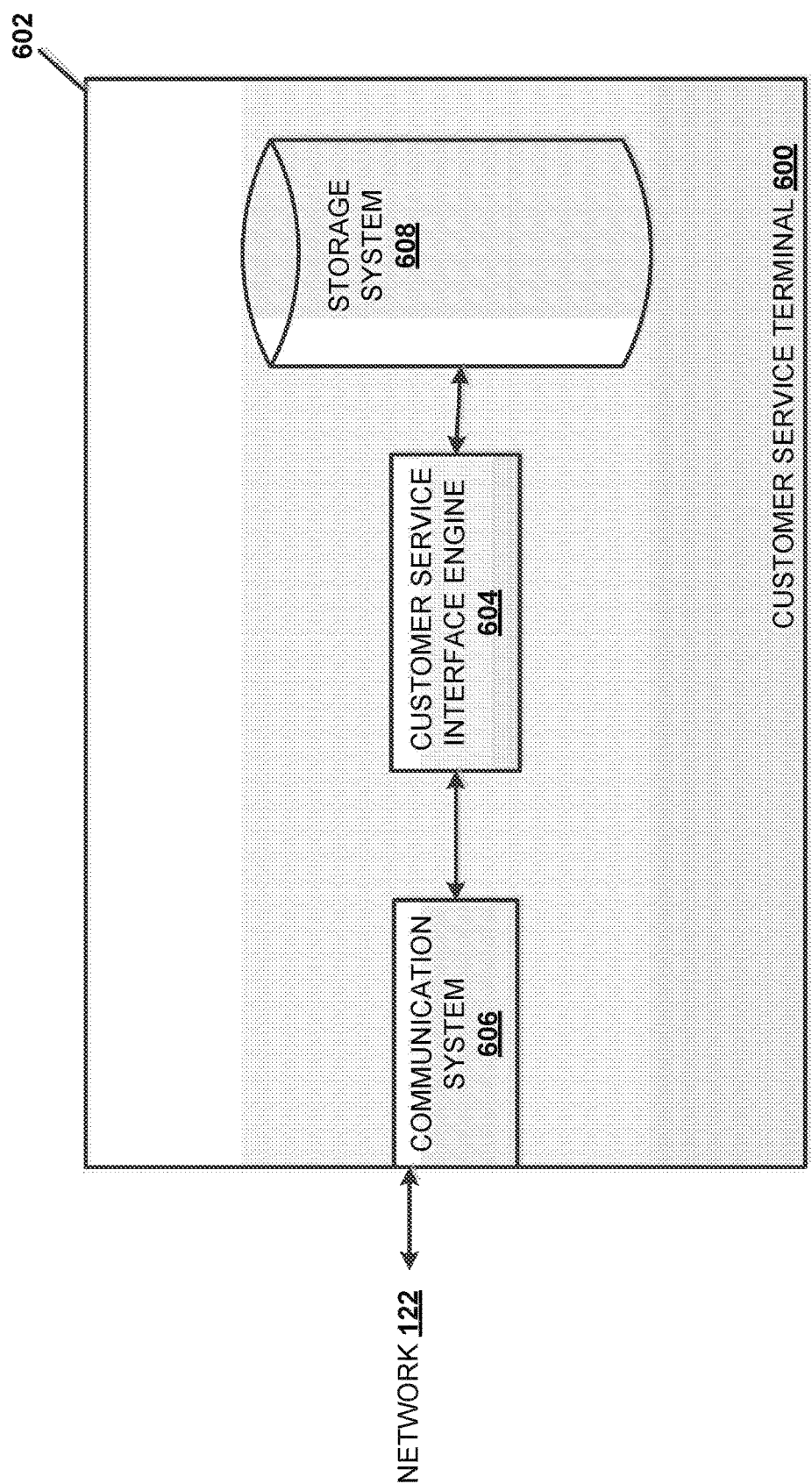
FIG. 6 is a schematic view illustrating an embodiment of a customer service terminal of the mid-tier messaging system of FIG. 1.

Referring now to FIG. 6, an embodiment of a customer service terminal 600 is illustrated that, in some embodiments, may be the customer service terminal 114 discussed above. As such, in some examples the customer service terminal 600 may be provided by one or more user computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the customer service terminal 600 includes a chassis 602 that houses the components of the customer service terminal 600, only some of which are illustrated in FIG. 6. For example, the chassis 602 may house a processing system (not illustrated) and a non-transitory memory system (not illustrated) that includes instructions that, when executed by the processing system, cause the processing system to provide a customer service interface engine 604 that is configured to perform the functions of the application engines and user computing devices discussed below according to the method 900. For example, the customer service interface engine 604 may provide a messaging interface to the customer service terminal 600 that allows a representative to communicate with a user, as well as perform any of the other functions of the customer service interface engine discussed below.

The chassis 602 may further house a communication system 606 that is coupled to the customer service interface engine 604 (e.g., via a coupling between the communication system 606 and the processing system) and configured to provide for communication through the network 122 as detailed below. The communication system 606 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 602 may also house a storage system 608 that is coupled to the customer service interface engine 604 through the processing system. The storage system 608 may store rules, settings, and/or other data utilized by the customer service interface engine 604 to provide the functionality discussed below. While the storage system 608 has been illustrated as housed in the chassis 602 of the customer service terminal 600, one of skill in the art will recognize that it may be connected to the customer service interface engine 604 through the network 122 without departing from the scope of the present disclosure. While a specific customer service terminal 600 has been illustrated and described, one of skill in the art in possession of the present disclosure will recognize that customer service terminals may include other components and/or component configurations for performing conventional functionality, as well as the functionality discussed below, while remaining within the scope of the present disclosure.

Figure 7:
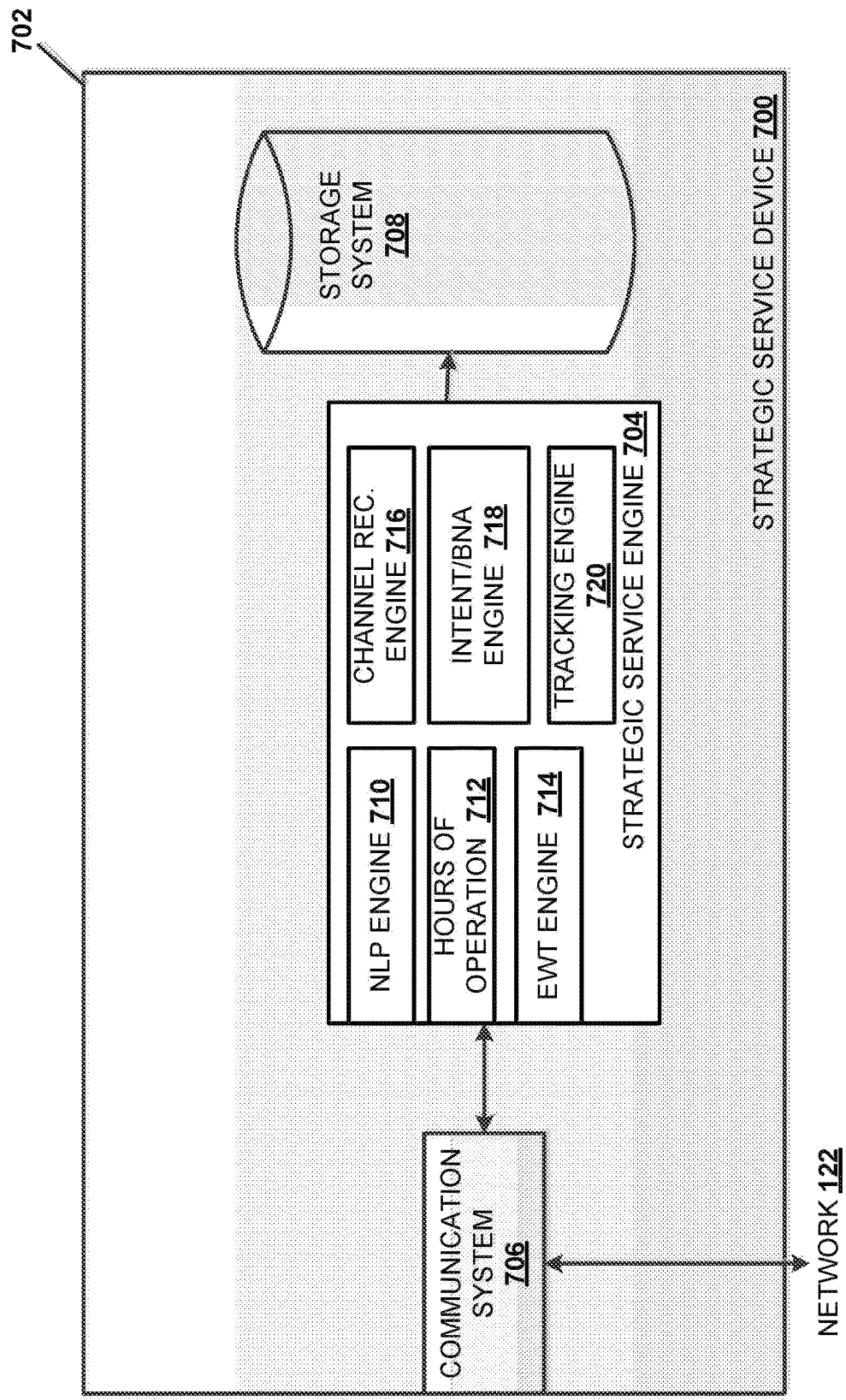
FIG. 7 is a schematic view illustrating an embodiment of a strategic services device of the mid-tier messaging system of FIG. 1.

Referring now to FIG. 7, an embodiment of a strategic service device 700 is illustrated. In an embodiment, the strategic service device 700 may be the strategic service device 118, discussed above. In the illustrated embodiment, the strategic service device 700 includes a chassis 702 that houses the components of the strategic service device 700, only some of which are illustrated in FIG. 7. For example, the chassis 702 may house a processing system (not illustrated) and a non-transitory memory system (not illustrated) that includes instructions that, when executed by the processing system, cause the processing system to provide a strategic service engine 704 that is configured to perform the functions of the strategic service engine and/or the strategic service device discussed below. In a specific example, the strategic service engine 704 may be software or instructions stored on a computer-readable medium that provides a plurality of strategic service such as, for example, a natural language processing (NLP) engine 710, an hours of operation (HOO) engine 712, an estimated wait time (EWT) engine 714, a channel recommendation engine 716, an intent/best next actions (BNA) engine 718, a tracking engine 720, and/or provide any of the other functionality that is discussed below.

The chassis 702 may further house a communication system 706 that is coupled to the strategic service engine 704 (e.g., via a coupling between the communication system 706 and the processing system) and configured to provide for communication through the network 122 as detailed below. The communication system 706 may be provided by a Network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 702 may also house a storage system 708 that is coupled to the strategic service engine 704 through the processing system. The storage system 708 may store rules, settings, and/or other data utilized by the strategic service engine 704 to provide the functionality discussed below. While the storage system 708 has been illustrated as housed in the chassis 702 of the strategic service device 700, one of skill in the art will recognize that it may be connected to the strategic service engine 704 through the network 122 without departing from the scope of the present disclosure. While a specific strategic service device 700 has been illustrated and described, one of skill in the art in possession of the present disclosure will recognize that strategic service devices may include other components and/or component configurations for performing conventional functionality, as well as the functionality discussed below, while remaining within the scope of the present disclosure.

Figure 8:
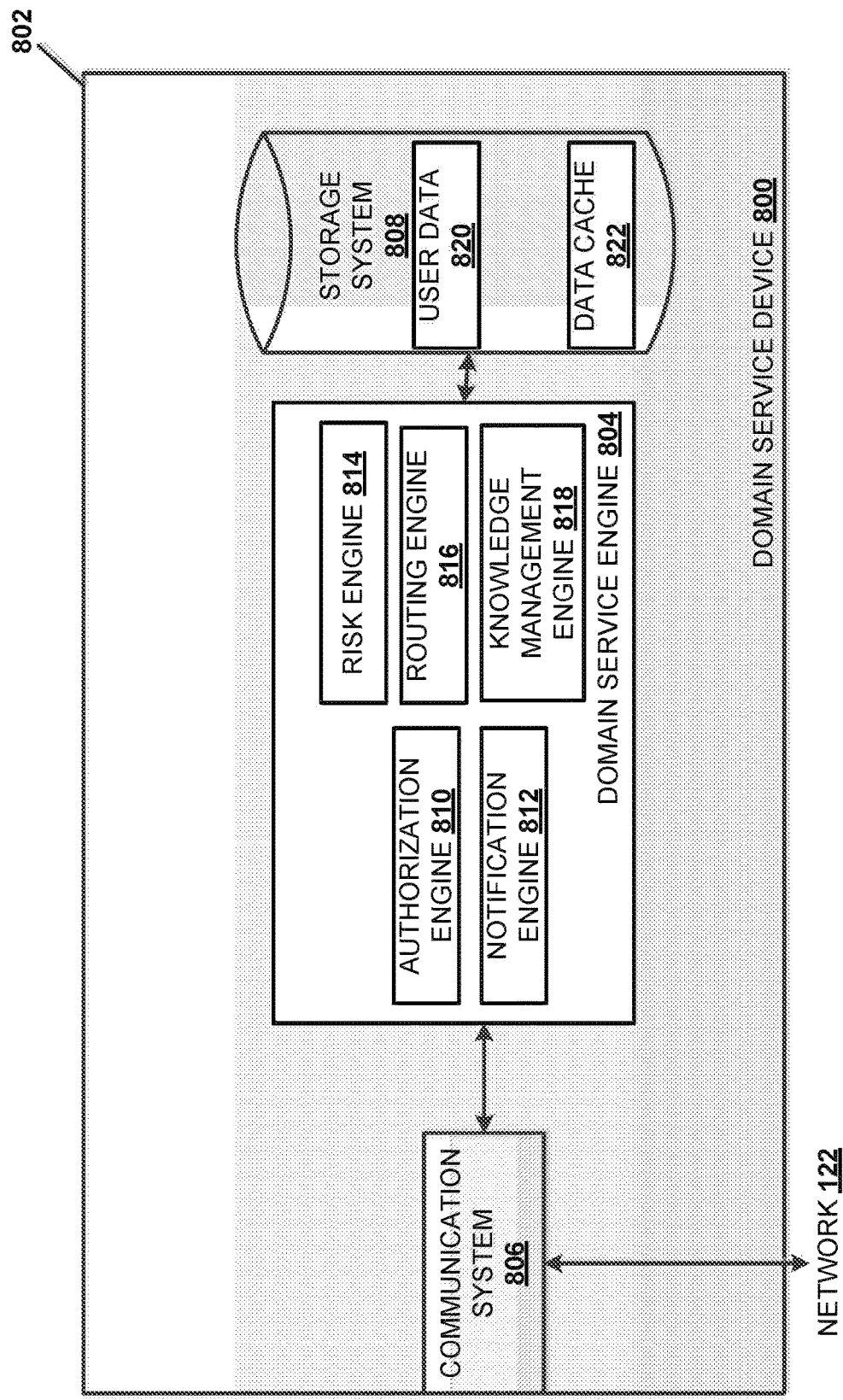
FIG. 8 is a schematic view illustrating an embodiment of a domain service device of the mid-tier messaging system of FIG. 1.
Figure 9:
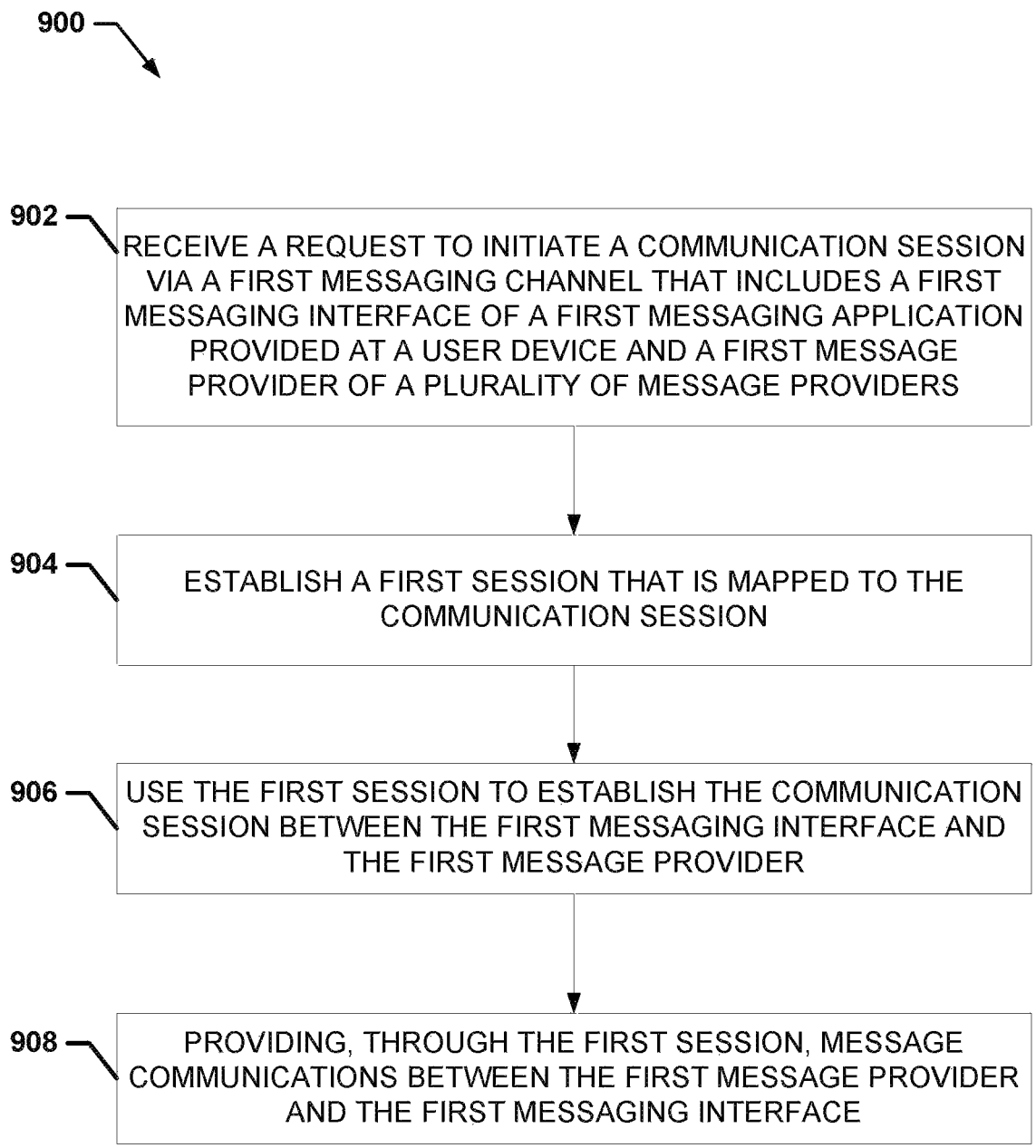
FIG. 9 is a flow chart illustrating an embodiment of a method of providing a communication session using the mid-tier messaging system.

Referring now to FIG. 8, an embodiment of a domain service device 800 is illustrated. In an embodiment, the domain service device 800 may be the domain service device 121, discussed above. In the illustrated embodiment, the domain service device 800 includes a chassis 802 that houses the components of the domain service device 800, only some of which are illustrated in FIG. 8. For example, the chassis 802 may house a processing system (not illustrated) and a non-transitory memory system (not illustrated) that includes instructions that, when executed by the processing system, cause the processing system to provide a domain service engine 804 that is configured to perform the functions of the domain service engine and/or the domain service device discussed below. In a specific example, the domain service engine 804 may be software or instructions stored on a computer-readable medium that provides a plurality of domain services such as, for example, an authorization engine 810, a notification engine 812, a risk engine 814, a routing engine 816, and/or provide any of the other functionality that is discussed below.

The chassis 802 may further house a communication system 806 that is coupled to the domain service engine 804 (e.g., via a coupling between the communication system 806 and the processing system) and configured to provide for communication through the network 122 as detailed below. The communication system 806 may be provided by a network Interface Controller (NIC), a wireless communication subsystem (e.g., a WiFi communication subsystem, a BLUETOOTH communication subsystem, a Near Field communication (NFC) subsystem, and/or other wireless communication subsystems known in the art), and/or any other communication components that would be apparent to one of skill in the art in possession of the present disclosure. The chassis 802 may also house a storage system 808 that is coupled to the domain service engine 804 through the processing system. The storage system 808 may include user account data 820, cached data 822 and/or any other data and/or instructions that would be apparent to one of skill in the art in possession of the present disclosure. While the storage system 808 has been illustrated as housed in the chassis 802 of the domain service device 800, one of skill in the art will recognize that it may be connected to the domain service engine 804 through the network 122 without departing from the scope of the present disclosure. While a specific domain service device 800 has been illustrated and described, one of skill in the art in possession of the present disclosure will recognize that domain service devices may include other components and/or component configurations for performing conventional functionality, as well as the functionality discussed below, while remaining within the scope of the present disclosure.

Referring now to FIGS. 1, 2, 3, 4, 5, 6, 7, 8, 9, 10A and 10B a method 900 for providing a communication session using mid-tier messaging is illustrated. In some embodiments of the method 900 described below, a mid-tier messaging system may perform the method 900. For example, a mid-tier messaging system may receive intent of a user attempting to establish a communication session with a service provider system. The mid-tier messaging system may begin a mid-tier session and cause a recommendation for a communication channel to provide the communication session. In response to receiving an indication to use the communication channel, the mid-tier messaging system may establish the communication channel between a message service provider and a messaging interface at the user device. For example, a payment service provider such as, for example, PayPal, Inc. of San Jose, Calif., may utilize a mid-tier messaging service device to perform the method 900 discussed below, and in some embodiments may operate in cooperation with one or more other service providers (via their service provider devices) and/or users (via their user computing devices) to perform the method 900 discussed below. However, these embodiments are meant to be merely examples, and one of skill in the art in possession of the present disclosure will recognize that a wide variety of service providers and users may operate, alone or together, to provide the systems and methods discussed herein without departing from the scope of the present disclosure.

The method 900 begins at block 902 where a request is received to initiate a communication session. In an embodiment of block 902, the mid-tier messaging engine 204 may receive an indication that a user of the user computing device 102 is requesting a communication session with a message provider service. For example, the mid-tier messaging engine 204 may receive a request from the messaging interface engine 306 of the user computing device 300 and/or the message interface engine 408 of the service provider device 400. The communication session may be between a messaging interface and a message provider service such as a bot platform, a live-chat platform, an asynchronous messaging platform, an email platform, and/or any other communication platform that may be apparent to one of skill in the art in possession of the present disclosure. Prior to method 900 and referring to an example mid-tier messaging flow diagram 1000 of the method 900 of the mid-tier messaging system 100 illustrated in FIGS. 10A and 10B, the service provider device 400 via the service engine 404 may receive or detect at block 1002 a user interaction with the service engine 404 such as a user interaction with a help webpage of a web site provided by the service engine 404 that the user of the user computing device 102 requests customer service help. However, as discussed in FIG. 11 below, the user interaction may be with an interactive voice response (IVR) system. The user interaction may include interaction information such as a topic on which the user of the user computing device 102 is requesting help with. The interaction information may also include any authentication information and user identification information that is available.

The service engine 404 may provide to a strategic service device 118 the user interaction which may include any of the interaction information that is available. Based on the interaction information, the intent/BNA engine 718 of the strategic service device 118, and/or any of the other strategic service engines 710-720 may determine an intent of the user that is interacting with the service engine 404 based on the interaction information. The intent/BNA engine 718 may determine that the intent of the user of the user computing device 102 is to connect with a customer help service to obtain help on a specific topic (e.g., a declined purchase), and the intent/BNA engine 718 determines that a best next action is establishing a communication session between a messaging interface and a message provider service is necessary to complete the user interaction. The channel recommendation engine 716 may determine a communication channel based on the intent and the best next action at block 1004. Furthermore, the channel recommendation engine 716 may determine the communication channel based on message provider information and user information. For example, the channel recommendation engine 716 may retrieve from the messaging database 120, the storage system 228, and/or the storage system 808 via the mid-tier messaging engine 204 user information that includes user history with the mid-tier messaging system 100, user account information with the service provider, user preferences, and other user information that would be apparent to one of skill in the art in possession of the present disclosure. For example, the mid-tier messaging engine 204 may cause the knowledge management engine 818 to retrieve user account data 820, cached data 822, and/or any other data and provide that data through the mid-tier messaging engine 204 via a messaging API 206 to the strategic services engine 704. In another example, the intent/BNA engine 718 and/or the channel recommendation engine 716 may use message provider information when determining best next actions and/or a channel recommendation. For example, the intent/BNA engine 718 and/or the channel recommendation engine 716 may interact with the hours of operation engine 712, the tracking engine 720 and/or the estimated wait time engine 714 that are providing message provide information that may be used to determine the best next action and/or a channel recommendation. While the strategic services engines 710-720 are illustrated as being located on the same strategic service device 700, one or more of the strategic service engines 710-720 may be on separate devices and can interact with each other via the mid-tier messaging engine 204.

Thus, based on the intent, message provider information, and user information the channel recommendation engine 716 may determine that the user interaction is an interaction that a bot platform provided by a message provider engine 504 is configured to service. In another example, the intent may indicate that the user interaction is an interaction that a live chat platform provided by the message provider engine 504 is configured to service. In another example, the intent, message provider information, and user information may indicate that the user interaction is an interaction that a live chat platform and/or another bot platform provided by the message provider engine 504 are configured to service. The channel recommendation engine 716 may consider message provider information provided by the hours of operation engine 712 and the estimated wait time engine 714 when deciding which of a live chat platform and/or a bot platform to recommend. For example, the time may be outside of the live chat platform's hours of operation, the estimated wait time for a live chat platform may satisfy a predetermined threshold, and/or the tracking engine 720 may indicate the success rate of servicing the intent with the bot platform and the live chat platform, whether the user has already tried to resolve the issue using one of the platforms and/or any other tracking information and/or message provider information provided by the strategic service engine 704.

The strategic service engine 704 may provide the communication channel recommendation to the service engine 404, which may provide the communication channel recommendation to the application engine 304 of the user computing device 300 which may in turn provide the communication channel recommendation to the user of the user computing device 300 at block 1006. The user may provide an input to the user computing device 300 indicating acceptance or a decline of the communication channel recommendation. In response to accepting the communication channel recommendation, the service engine 404 and/or the application engine 304 may provide a request to establish a communication channel with the identified messaging service provider to the mid-tier messaging engine 204 and provide the messaging interface engine 306 and/or 408. In other examples, the messaging interface provided by the messaging interface engine 306 and/or 408 may automatically initiate and be provided to the user via the user computing device 102 and provide the request to establish a communication channel with the identified messaging service provider to the mid-tier messaging engine 204. In other examples, the web application provided by the service provider device 400 may offer all possible communications channels from which the user may select without using the strategic services engine 704. Thus, the user may select a messaging interface engine 306 and/or 408 and a message provider to communicate with and generate the request with that message provider. In various embodiments, the request may include authentication information such as an authentication token that the user provided when logging into the service provider device 400 that indicates the user account and user identified in the communication session. The request may include other information such as user information, intent of the user, and/or any other information that would be apparent to one of skill in the art in possession of the present disclosure.

Figure 10A:
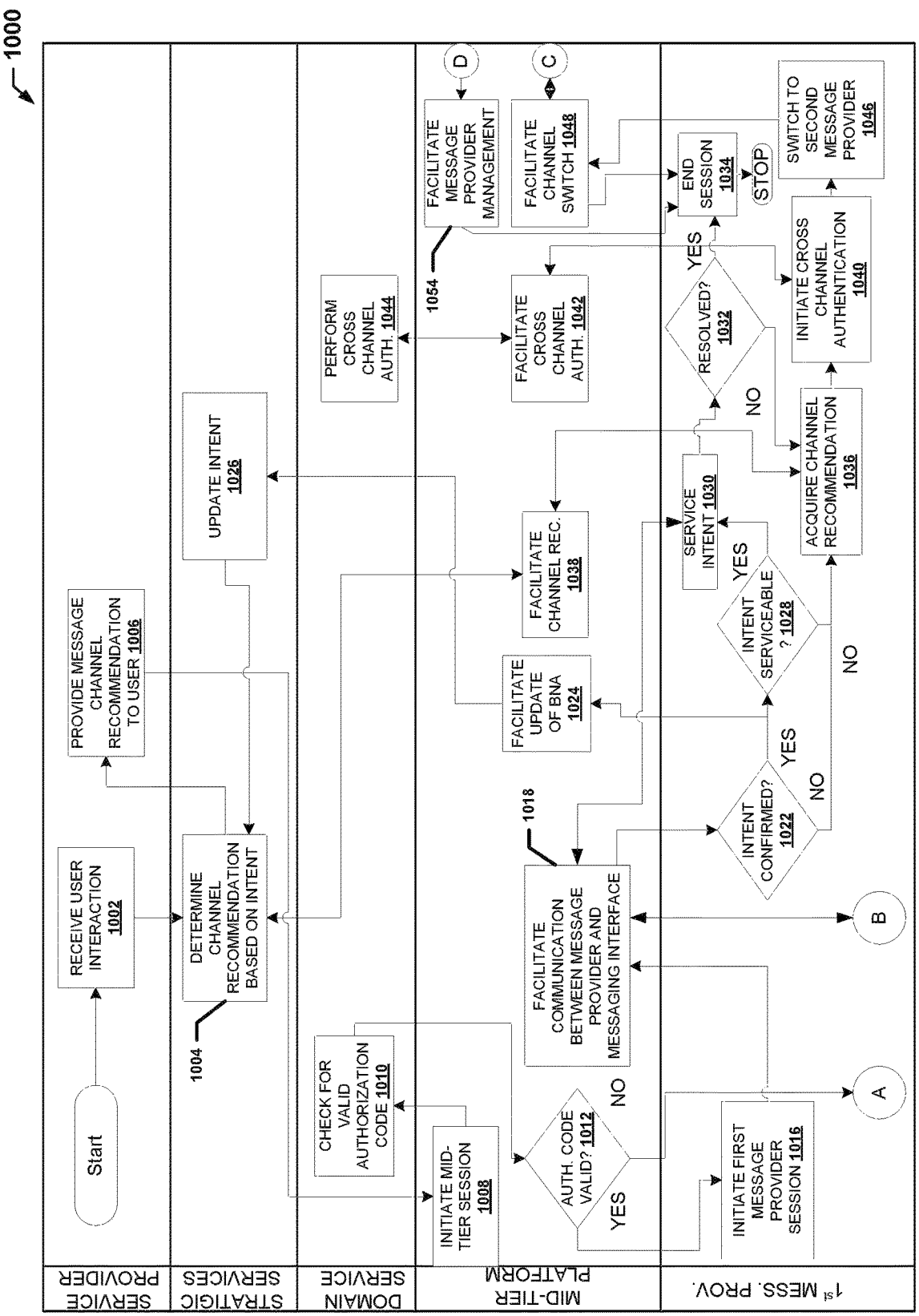
FIG. 10A is a flow diagram illustrating an embodiment of the method of providing the communication session using a mid-tier messaging system of FIG. 1.

The method 900 then proceeds to block 904 where a mid-tier session is established that is mapped to the communication session. In an embodiment of block 904, the session creation engine 224 of the mid-tier messaging engine 204 may create a mid-tier session that is mapped, by the session management engine 212 to the communication session that is requested by the service provider device and/or user computing device. A mid-tier session identifier (e.g., a unified messaging interaction identifier (UMID), a universal conversation identifier (UCID)) may be associated with the communication session such as a communication session identifier. The mid-tier session identifier may also be mapped to with a user identifier and/or a user account identifier such as a phone number, an email address, a credit card number, an account number, a username, a biometric identifier, and/or any other user/user account identifier that would be apparent to one of skill in the art in possession of the present disclosure. The session management engine 212 may map service provider identifiers, message provider identifiers, messaging interface identifiers, message provider types, and/or other identifiers to the mid-tier session identifier. The mappings of the various identifiers and/or sessions to the mid-tier session identifier may be stored in the messaging interactions logs 236. Referring now to FIG. 10A, the session creation engine 224 may initiate a mid-tier session at block 1008 and the session management engine 212 may map that mid-tier session to the messing interface identifier, the service provider identifier, and/or the user identifier.

In various embodiments, the session creation engine 224 may be coupled to an authorization engine 810 provided by the domain service engine 804 included on the domain service device 800. An identity messaging API of the messaging APIs 206 may facilitate the transfer of any authentication information provided in the request to establish a communication session from the user computing device 300 and the service provider device 400. The authorization engine 810 may perform an authentication procedure to determine whether the identity of the user is verified before establishing the communication session. For example, at block 1010 the authorization engine 810 may determine whether an authorization token received in the request to establish a communication session is valid. The authorization engine 810 may provide to the identity messaging API the results of the authentication procedure and if the authentication is unsuccessful as indicated at decision block 1012, the mid-tier messaging engine 204 may provide to the messaging interface engine 306 and/or 408 a notification that the communication session has ended at block 1014. The notification may indicate that the authentication was unsuccessful. If the authentication was successful, then the method 900 may proceed to block 906.

The method 900 then proceeds to block 906 where the mid-tier session is used to establish the communication session between the first messaging interface and the first message provider. In an embodiment of block 906, the mid-tier messaging engine 204 may cause the message provider engine 504 to establish a message provider session. The message provider session may include a message provider session identifier that is associated with or otherwise mapped to the mid-tier session via the session management engine 212. As illustrated in FIG. 10A at block 1016, the mid-tier messaging engine 204 may cause a messaging provider engine 504 identified in the request to establish a communication session to initiate a message provider session. For example, if the channel recommendation at block 1004 was to establish a communication session between a messaging interface engine 306/408 and a bot platform that is provided on the message provider service device 110, then the mid-tier messaging engine 204 may cause the message provider engine 504 of the message provider service device 110 to initiate a message provider session with that bot platform. In another example, if the messaging channel recommendation at block 1004 is to establish a communication session between the messaging interface engine 306/408 and a live chat platform that is provided on the message provider service device 112, then the mid-tier messaging engine 204 may cause the message provider engine 504 of the message provider service device 112 to initiate a message provider session with that live chat platform.

The method 900 then proceeds to block 908 where message communications are provided, through the mid-tier session, between the first message provider and the first messaging interface. In an embodiment of block 908, the mid-tier messaging engine 204 may provide a pass through API of the plurality of messaging APIs 206. The pass through API facilitates communications between the messaging provider engine 504 and the messaging interface engine 306 and/or 408. For example, the pass through API may receive messages from the message provider engine 504 and provide those messages to the messaging interface engine 306 and/or 408. Likewise, the pass through API may receive messages from the messaging interface engine 306 and/or 408 and provide those messages to the message provider engine 504. As illustrated in FIG. 10A, at block 1018 and 1020 the mid-tier messaging engine 204 may facilitate communication between the message provider and the messaging interface.

In addition to facilitating pass through communication between the messaging interface engine 306 and/or 408 and the message provider engine 504, the mid-tier messaging engine 204 may be configured to perform several actions or operations to increase engine capabilities. For example, the mid-tier messaging engine 204 may provide a message normalization engine 214 that is configured to normalize messages communications that are received at the mid-tier messaging engine 204 such that the mid-tier messaging engine 204 may translate the messaging format and/or structure of messages from one messaging interface with the messaging format and/or structure of a message provider service. Similarly, the message normalization engine 214 may normalize message communications such that the message communications are translated into a format/structure that is understandable by the mid-tier messaging engine 204.

In another embodiment, the mid-tier messaging engine 204 may include a privacy engine 210 that is configured to process sensitive information from the message communications. For example, the privacy engine 210 may be configured to identify and remove payment card information (PCI) data, if entered by the user in the messaging interface engine 306/408. In another example, personal identification information (PII) may be identified and masked by the privacy engine 210 before it is provided to a third-party message provider service and/or any other third party service in the mid-tier messaging system 100. However, on the return path, the privacy engine 210 may tie the response from the message provider service back to the customer specific account managed by the provider of the mid-tier messaging system 100. In various examples, the privacy engine 210 may also be configured to encrypt message communications and other data received at the mid-tier messaging engine 204.

In various embodiments, the mid-tier messaging engine 204 may include a tracking engine 208 that is configured to store the message communications in the message history 234 stored in the storage system 228. The message communications may be associated with the communication session identifier, the mid-tier session identifier, the user identifier and/or any of the other identifiers that are mapped with the mid-tier session. In an embodiment, the tracking engine 208 and/or other messaging APIs may log data that allows reporting on health and performance (e.g., response time, failure data, timeouts, and other health and performance data) of the mid-tier messaging system 100 in the systems logs 230. In various embodiments, some message provider services may be stateless and only operate off of the full conversation. Thus, the mid-tier messaging engine 204 may obtain the full conversation history from a cache that may be included in the messaging database 120 each time the stateless message provider service is invoked. However, of other message service providers that are not stateless, the mid-tier messaging engine 204 may provide the only the last message to that message service provider.

In various embodiments, the mid-tier messaging engine 204 may use the tracking engine 208 to log and unify disparate messaging interactions across communications channels and/or within the same channel (e.g., asynchronous messaging). For example, if a user leaves a communication session midway and subsequently establishes a new communication session, the mid-tier messaging engine 204 will retrieve logs from the message interaction logs 236 and/or message history 234 of the incomplete communication session which can be queried from the message provider service and the user can be directed to complete the messaging interaction. In another example, a user may conduct a communication session via a first messaging interface with a message provider service and may subsequently check on a status of a request made in the communication session via a second messaging interface. The mid-tier messaging engine 204 may tie these inquiries together using the message interaction logs 236 and/or the message history 234 and ensure the user has a contextual continuation in their messaging interaction with message provider service.

As such, the mid-tier messaging engine 204 will facilitate contextual servicing of a user's messaging interactions spread out over time. This is commonly referred to as asynchronous messaging and would involve the user submitting a message and going away. On the message provider service side, an agent would respond to the user's message in an offline mode. Later, the user comes back, views the agent response, replies to the response, and goes away. This time another agent responds to the customer but with context of the entire conversation history (e.g., previous agent responses factored in).

To unify disparate messaging interactions across messaging channels and/or within the same messaging channel. The mid-tier session identifier issued by the mid-tier messaging engine 204 may tie together the plurality of disparate communication sessions. As discussed above, the mid-tier session identifier may be associated with a communication session identifier communication session identifier, a user identifier, service provider identifiers, message provider identifiers, messaging interface identifiers, message provider types, and/or other identifiers that would be apparent to one of skill in the art in possession of the present disclosure. The communication session identifier may include a data field that tracks chunks of a conversation over time. For example, a message communications may have happened in the morning and another at night, but are part of the same conversation topic.

In various embodiments, the mid-tier messaging engine 204 may include a configuration engine 222 that is configured to provide controls to the mid-tier messaging system 100. For example, the configuration engine 222 may provide a user interface for an administrator to create and edit configurations 232 stored in the storage system 228. The configuration engine 222 may be configurable to control the mid-tier messaging system 100 by service provider, type of message provider, message provider, intent of user, entry point to the mid-tier message provider (e.g., a $3^{rd}$ party message service, a service provider website, a phone service), intent determination, routing engine, customer service terminal, domain services, strategic services, and/or any other service that the configuration engine may configure with the mid-tier messaging system 100.

Figure 10B:
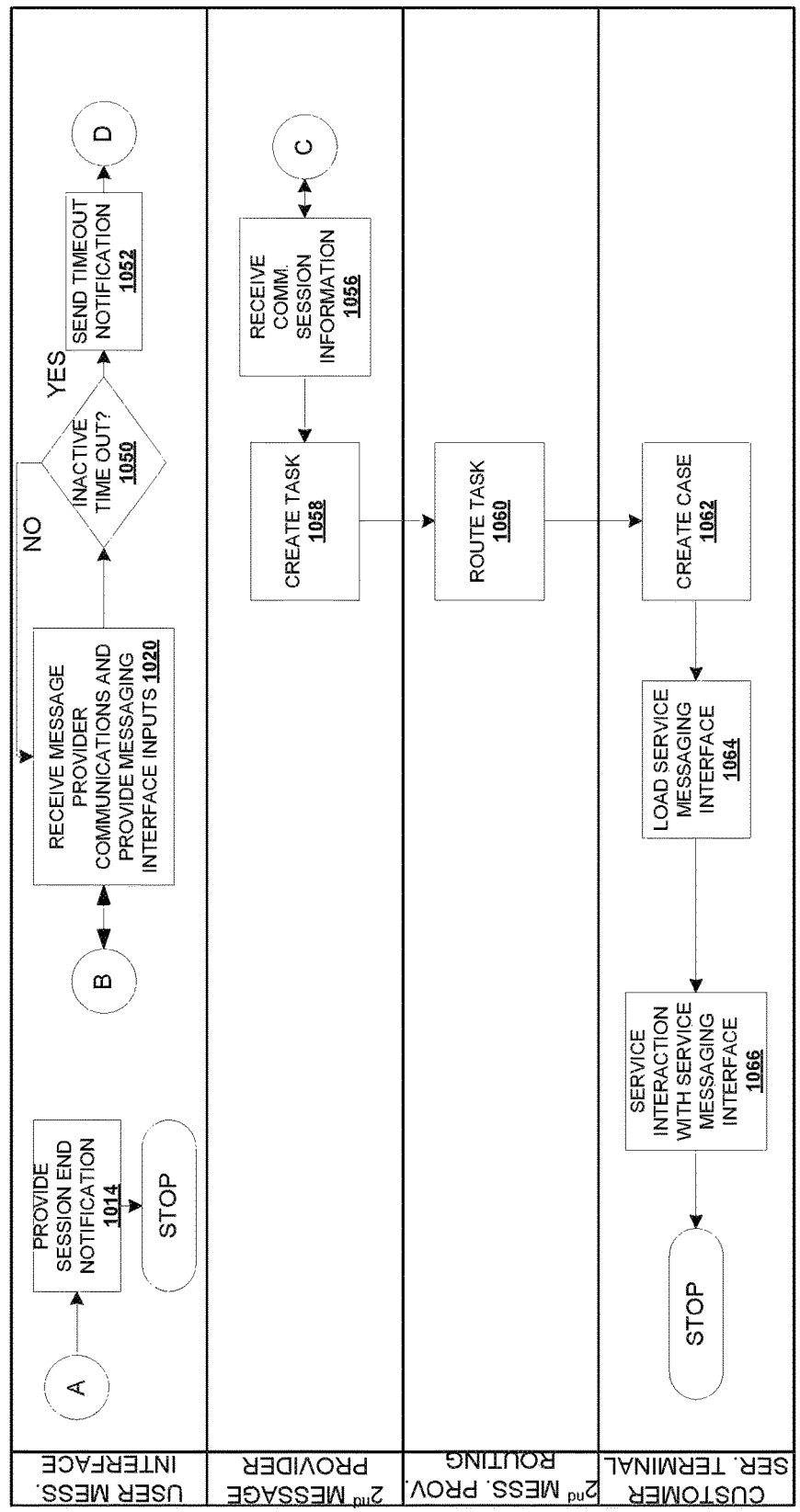
FIG. 10B is a flow diagram illustrating additional steps of the method of providing the communication session using a mid-tier messaging system of FIGS. 9 and 10A.

In various embodiments of method 900 and with reference to the mid-tier messaging flow diagram 1000 in FIGS. 10A and 10B, during the passing of message communications between the message provider engine 504 and the messaging interface 306/408, the message provider engine 504 may be configured to confirm the intent that was determined by the intent/BNA engine 718 of the strategic service engine 704 as illustrated at decision block 1022. If the intent is confirmed, then the intent is logged by the mid-tier messaging engine 204 and stored in the messaging interactions log 236 of the storage system 228. Also, if the intent is confirmed, mid-tier messaging engine 204 may facilitate the update of the intent at the strategic service engine 704 at blocks 1024 and 1026 such that the strategic service engine 704 may reinforce any machine learning capabilities that the strategic service engine 704 may use in determining intent and best next actions. In various embodiments, the channel recommendation engine 716 and/or the intent/BNA engine 718 may include one or more machine learning algorithms such as frequent pattern growth heuristics, other unsupervised learning algorithms, supervised learning algorithms, semi-supervised learning algorithms, reinforcement learning algorithms, deep learning algorithms, and other machine learning algorithms known in the art that are used when making channel recommendations, determining intent, and/or determining best next actions.

The mid-tier messaging flow diagram 1000 then proceeds to decision block 1028 where the message provider engine 504 determines whether the intent is serviceable. If the intent is serviceable, the message provider engine 504 services the intent by passing message communications with the messaging interface engine 306 and/or 408 as illustrated at block 1030. The message provider engine 504 may determine whether the intent of the communication session is resolved at decision block 1032. If the intent is resolved the message service provider session may end at block 1034. In addition, the session management engine 212 provided by the mid-tier messaging engine 204 may be configured to terminate the mid-tier session that is mapped to the message provider session. In various embodiments, the session management engine 212 may be configured to emulate and listen to a session lifecycle of the message provider session. For example, if the message provider session times out, then the mid-tier session mapped to that message provider session should time out by the session management engine 212. As illustrated in FIG. 10B, the message provider engine 504 and/or the messaging interface engine 306/408 may determine that the user is inactive at decision block 1050 and may provide a time out notification to the session management engine 212 provided by the mid-tier messaging engine 204 at block 1052. The session management engine 212 may facilitate management of the message provider session and cause the message provider session to end at block 1054. Likewise, the session management engine 212 may cause the mid-tier session that is mapped to the message provider session to end. Similarly, the session management engine 212 may be configured to emulate and listen to a session lifecycle of the authentication of the user. For example if the authentication session at block 1010 at the domain service engine 804 time out, then the mid-tier session should time out.

If the intent cannot be confirmed at decision block 1022, the intent is not serviceable at decision block 1028, or the intent is not resolved at decision block 1032, then the message provider may request a channel recommendation at block 1036. The message provider engine 504 may request the channel recommendation via the channel recommendation engine 216 of the mid-tier messaging engine 204. The channel recommendation engine 216 may include an API that is configured to pass channel recommendations between the channel recommendation engine 716 of the strategic service engine 704 and the message provider engine 504 as illustrated at block 1038. The channel recommendation may be based on the updated intent, which may be updated based on information the strategic service engine 704 received subsequent to making the initial channel recommendation at block 1004. The channel recommendation may be for a second message provider service. For example, the first message provider service may be provided by a bot platform and the second message provider service may be provided by live chat platform.

After the channel recommendation for the new channel is received, the message provider engine 504 may initiate a cross channel authentication at block 1040 by communicating with a cross channel authorization engine 220 to facilitate the authentication of the user with the second message provider at block 1042. The cross channel authorization engine 220 may retrieve the authentication information from the first message provider session and store it in the storage system 228 such that the second message provider may retrieve the authentication information and cause the authorization engine 810 of the domain service engine 804 to validate the authentication information in block 1044.

After the cross channel authentication is initiated in block 1040, the first message provider service at block 1046 may initiate the channel switch such that the communication session between the first messaging interface and the first message provider service is between the first messaging interface and the second message provider service. The first message provider service may communicate with the channel switching engine 218 provided by the mid-tier messaging engine 204 that may include a channel switching API. The channel switching engine 218 may be configured to facilitate the channel switch at block 1048. For example, the channel switching engine 218 may be configured to integrate with the channel recommendation engine 216 to acquire the channel recommendation and determine the next communication channel that includes the second message service provider. The channel switching engine 218 may also be configured to store all of the message history in the message history 234 that occurred over the first communication channel between the messaging interface 306/408 and the first message provider service such that when the switch to the second channel occurs, the switch appears seamless for the user of the user computing device 102 as none of the message communications are lost. Similarly, the channel switching engine 218 is configured to pass the intent from the first communication channel to the second communication channel such that the second message provider has access to the intent as well as the message communications that were passed over the first channel. In a multiple message channel journey for the user, the channel switching engine 218 may be configured to retrieve all messaging channel interaction history from the storage system 228 for that user based on the user identifier and/or the mid-tier session identifier, unify message history 234 from multiple channels, and offer that message history 234 to the next communication channel. The channel switching engine 218 may also be configured to pass on authentication information to the second message provider such that cross channel authentication may occur at the second message provider.

As illustrated at block 1056 of FIG. 10B, the second message provider may receive the communication session information from the channel switching engine 218. In the illustrated example, the second message provider may be a live chat platform. Using the communication session information, the second message provider may create a task at block 1058. The task may be routed by the routing engine 816 via the domain service engine 804 to a customer service terminal 114 at block 1060. The task may be routed based on the intent, estimated wait times of the customer service terminals, and/or any other routing factors that may be apparent to one of skill in the art in possession of the present disclosure. The customer service interface engine 604 may create a case at block 1062 that includes the communication session and store the case in a queue at the storage system 608 until the customer service representative is available to process the case. The customer service interface engine 604 may load the communication session on the customer service interface at block 1064. The customer service interface engine 604 may provide the complete message history that occurred between the user and the first message provider. A customer service representative, via the customer service interface engine 604, may service the intent of the communication session. The customer service interface engine 604 via the second message provider service may provide to the mid-tier messaging engine 204 message history and messaging interactions such as changes in intent, status of inquiry (e.g., successful, unsuccessful) and any other messaging interaction information that would be apparent in the art. The message interaction information and message history may be stored in the storage system 228 and associated with the mid-tier session identifier and/or user identifier. The mid-tier messaging engine 204 may also pass any of the communication session information to the strategic services engine 704 and/or domain services engine 804 for future use or to update machine learning algorithms to provide more accurate best next actions or channel recommendations.

In other examples, the mid-tier messaging engine 204 may be used to abstract a customer relationship management (CRM) system and the customer service terminal 114 such that the two are connected through the mid-tier messaging engine 204. Similarly, the mid-tier messaging engine 204 may be used to create and/or use bots that may enhance the experience presented to the user when interacting with a customer service representative at via the customer service interface engine 604. For example, the customer service representative may use a short message service (SMS) one-time password (OTP) bot that is in communication with the customer service interface engine 604 through the mid-tier messaging engine 204 to verify an identity of the user requesting login assistance. In other examples, the customer service interface engine 604 may be coupled through the mid-tier messaging engine with a supervisor agent's customer service terminal and interact with the supervisor agent via another customer service terminal interface. While specific examples of abstracting different modules and systems within a mid-tier messaging system 100 are provided, one of skill in the art in possession of the present disclosure would recognize that other modules, programs, and/or customer service systems may be coupled to the mid-tier messaging system 100 via the mid-tier messaging engine 204.

In various embodiments, if, during a communication session between a messaging interface 306/408 and a message provider service such as a bot or a live chat, the communication session is disconnected, the mid-tier messaging engine 204 may facilitate retrial and re-establishment of the communication session. For restarting the communication session, because the mid-tier management engine 204 has knowledge of where the communication session was disconnected due to the storage of the message history, the mid-tier messaging engine 204 may help restart the communication session from where it ended, rather than the customer having to submit all the messages again in the restarted session.

Figure 11:
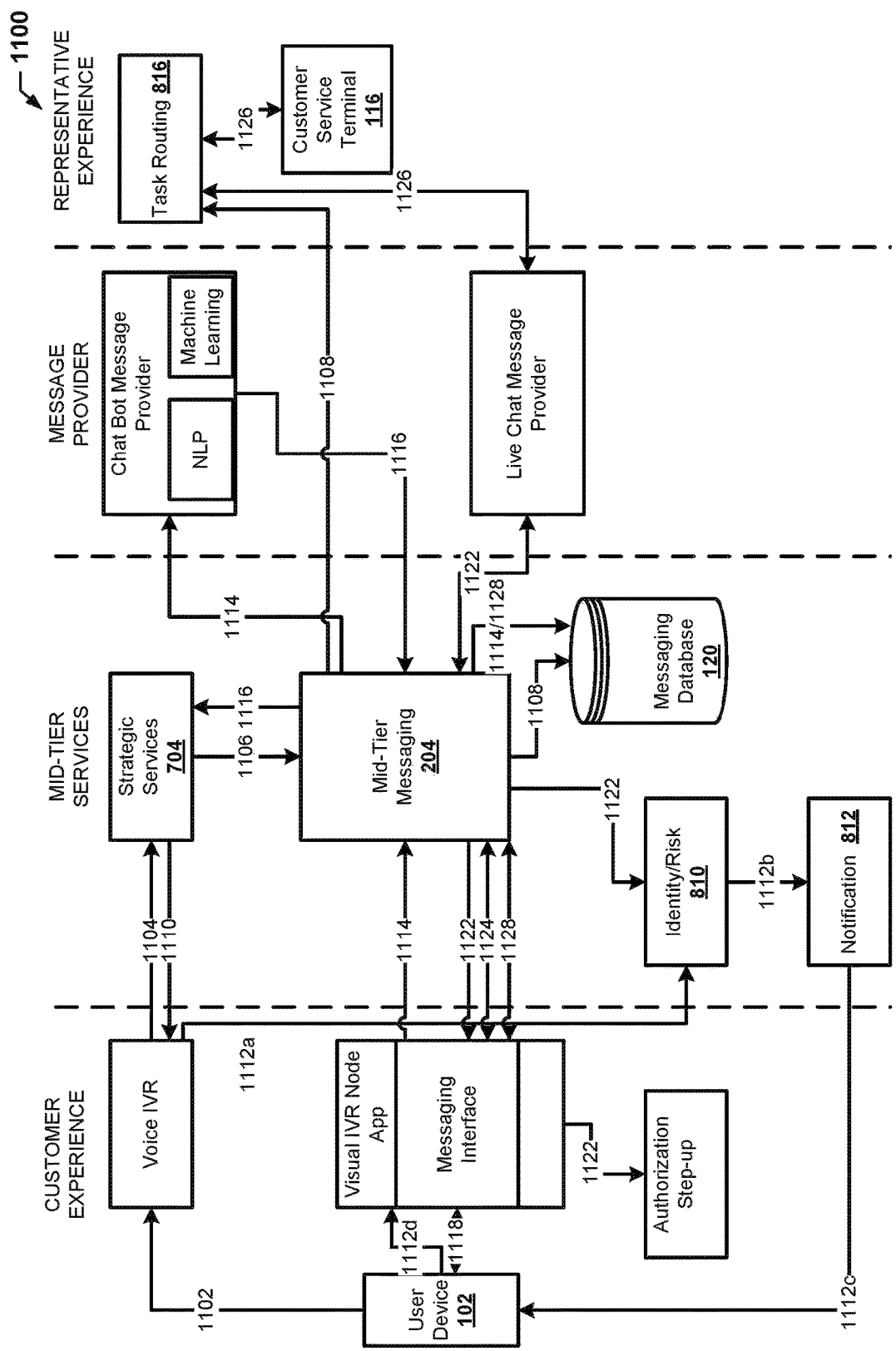
FIG. 11 is a flow diagram illustrating an embodiment of the mid-tier messaging system switching between an IVR channel and a messaging channel.

Referring now to FIG. 11, a flow diagram illustrates an embodiment of the mid-tier messaging system switching between an IVR channel and a messaging channel. At step 1102 the user via the user computing device 102 may call into a call center and is serviced with an interactive voice response (IVR) system. The IVR system may pass any user intent gathered from the voice interaction with the user to the strategic services engine 704 at step 1104. The strategic services engine 704 may request, at step 1106, from the mid-tier messaging engine 204, channel information about the various communication channels available such as estimated wait times, status of channels, and other information that would be apparent to one of skill in the art in making a channel recommendation. At step 1106, the strategic services engine 704 may also request user information that is associated with the user that is interacting with the IVR system such as contact history to the mid-tier messaging system. The mid-tier messaging engine 204 may retrieve from the messaging database 120 the user information and any of the channel information from the various channels (e.g., EWT of the live message channel) at step 1108 and return that information to the strategic services engine 704. The strategic services engine 704 may make a channel recommendation and provide that channel recommendation to the user of the user computing device 102 at step 1110. For example, the strategic service engine 704 may make a recommendation to a lower cost bot platform that provides a lower cost channel than compared to the voice call.

In response to the user of the user computing device 102 selecting to accept the channel recommendation, the IVR system may initiate a visual IVR session for the communication channel at step 1112a and authenticate or calculate risk in servicing the user using the authorization engine 810 and/or the risk engine 814 of the domain service engine 804. While step 1112a is illustrated as being directly initiated by the IVR system and the domain services engine 804, the IVR system may interact with the domain services via the mid-tier messaging engine 204. Upon successful authentication of the user, the visual IVR session may be initiated at step 1112b and a notification generated by the notification engine 812 of the domain service engine 804 may sent to the user computing device 102 such as through an SMS message at step 1112c. The user computing device 102 may receive an input from the user to launch a communication channel that includes a messaging interface and with a bot platform at step 1112d. The messaging interface may be the text messaging interface of a phone or a messaging interface provided by the service provider device 104 or a messaging interface installed on the user computing device 102.

The messaging interface may initiate and establish a communication session via the mid-tier messaging engine 204 with the bot message provider at step 1114. Message communications may be passed between the messaging interface and the bot message provider. The mid-tier messaging engine 204 may update the storage system 228 with the interactions. If the inquiry is not resolved at step 1114, the bot message provider may initiate with mid-tier messaging engine 204 a channel switch request at step 1116, which causes the mid-tier messaging engine 204 to send a new intent to the strategic service engine 704, if available, and receive a decision on the next communication channel from the strategic service engine 704. The mid-tier messaging engine 204 may then offer the next communication channel which may include a live chat message platform at step 1122, establish the communication channel between the messaging interface and the live message provider by causing a live message provider session to be mapped to the mid-tier session and removing a bot message provider session from the mid-tier session, and perform the cross channel authentication of the user/user computing device 102 with the authorization engine 810 of the domain service engine 804.

Message communications may be passed between the messaging interface to the mid-tier messaging engine 204 at step 1124 and the message communications for the live message channel may be routed by the routing engine 816 to a customer service terminal 114 that provides a customer service messaging interface for servicing the live message provider channel at step 1126. The message communications may be provided between the messaging interface and the customer service messaging interface provided by the customer service messaging interface. At step 1128, the communication session and channel may be terminated by the mid-tier messaging engine 204 and/or the message provider service when the inquiry from the user computing device 102 has been serviced and/or otherwise completed. At step 1128, the mid-tier messaging service may also update the messaging database 120 with the results of the communication session.

Thus, a system and method for a mid-tier messaging service that facilitates communication over a communication channel that includes a messaging interface and a message provider service that provide message communications between each other has been described. The mid-tier messaging service may interact with domain services and strategic services such that a channel recommendations may be made to a user recommending which messaging interface and message provider the user should use to establish a communication session to resolve the issue the customer is inquiring about. If the issue cannot be resolved using the first message channel, the mid-tier messaging service will provide a recommendation for a second channel and facilitate the switching of the channels such that the transition is seamless to the user. By providing an abstraction layer, the mid-tier messaging service also allows for easy integration and removal of services and platforms that are used in the mid-tier messaging service. This offers isolation from a tight integration with message providers such that message providers may be switched easily to test message providers to decide which message provider works best.

Figure 12:
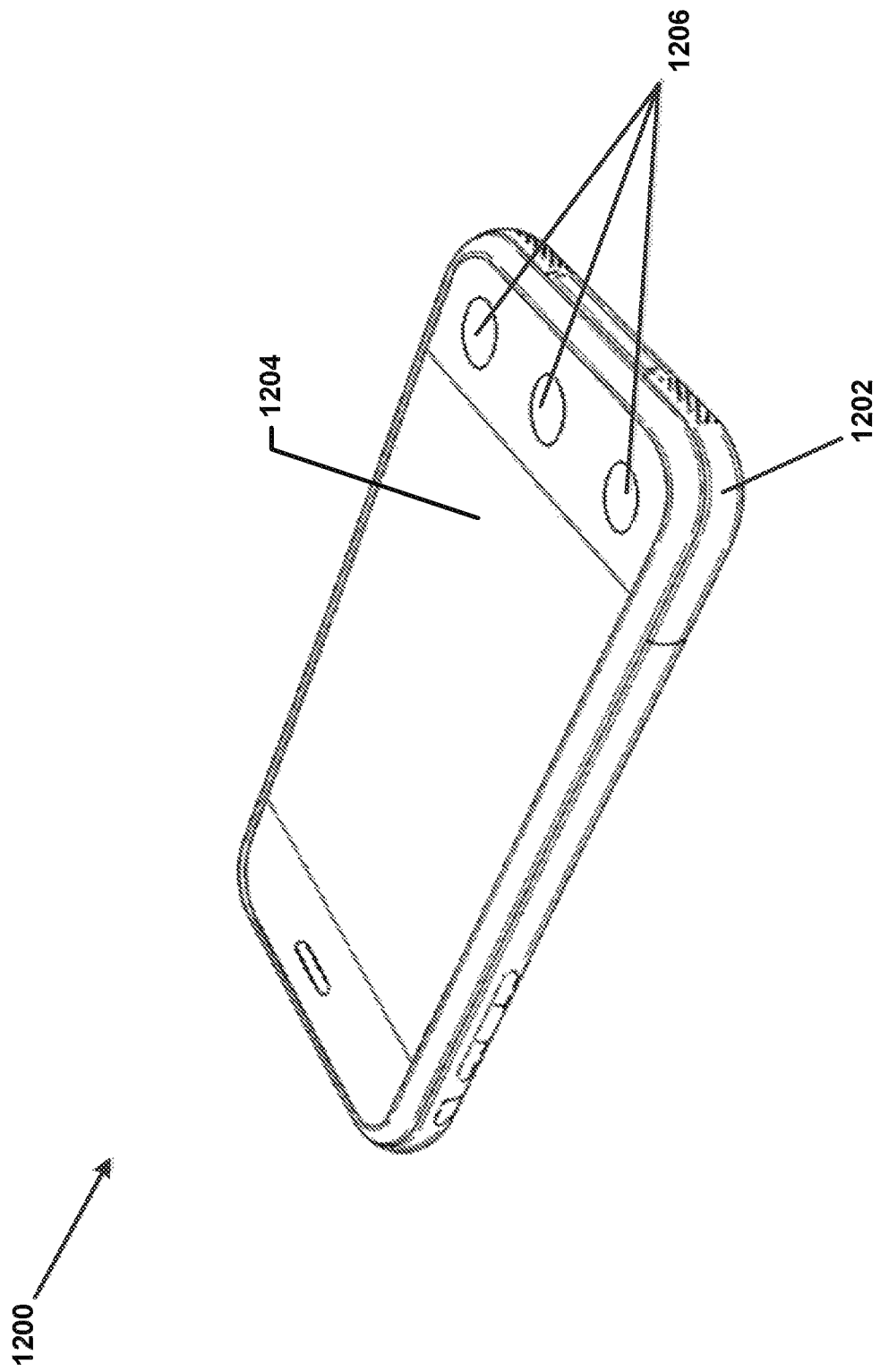
FIG. 12 is a perspective view illustrating an embodiment of a user device.

Referring now to FIG. 12, an embodiment of a user device 1200 is illustrated. The user device 1200 may be any of the user computing devices discussed above. The user device 1200 includes a chassis 1202 having a display 1204 and an input device including the display 1204 and a plurality of input buttons 1206. One of skill in the art will recognize that the user device 1200 is a portable or mobile phone including a touch screen input device and a plurality of input buttons that allow the functionality discussed above with reference to the method 900. However, a variety of other portable/mobile devices and/or desktop devices may be used in the method 900 without departing from the scope of the present disclosure.

Figure 13:
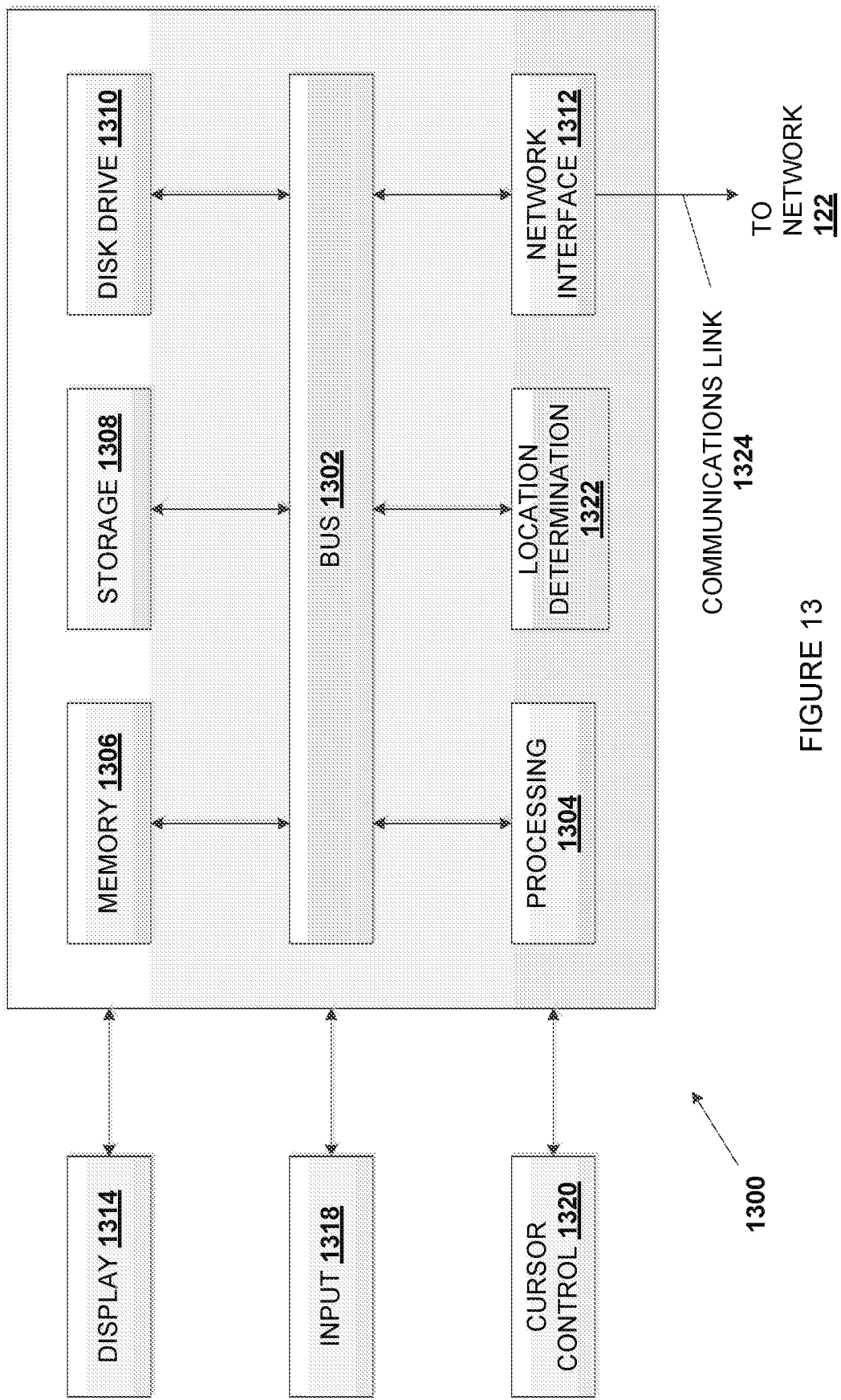
FIG. 13 is a schematic view illustrating an embodiment of a computer system.

Referring now to FIG. 13, an embodiment of a computer system 1300 suitable for implementing, for example, the user computing devices, the customer service terminals, the service provider devices, and the mid-tier messaging devices, the domain service devices, the strategic services devices, the message provider devices, and the messaging database is illustrated. It should be appreciated that other devices utilized in the mid-tier messaging system 100 discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), and/or a location determination component 1322 (e.g., a Global Positioning System (GPS) device as illustrated, a cell tower triangulation device, and/or a variety of other location determination devices known in the art.) In one implementation, the disk drive component 1310 may comprise a database having one or more disk drive components.

In accordance with embodiments of the present disclosure, the computer system 1300 performs specific operations by the processor 1304 executing one or more sequences of instructions contained in the system memory component 1306, such as described herein with respect to the user devices, the customer service terminals, the service provide system, and/or the third party databases. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, DVD, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 322 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled to the non-transitory memory and configured to read instructions from the non-transitory memory to cause the system to perform operations comprising:
   receiving a request to initiate a first communication session via a first messaging interface of a first message provider associated with a first messaging channel at a user device;
   establishing, based on the received request, a mid-tier session that includes a mid-tier session identifier that is mapped to a first communication session identifier for the first communication session and a user identifier associated with a user of the user device;

determining, based in part on an interaction of the user with the first messaging channel of the first message provider during the first communication session, an intent of the user associated with the user device;

determining that a second messaging channel associated with a second message provider is available to satisfy the intent of the user based on at least one predetermined threshold condition;

mapping the mid-tier session identifier to a second communication session identifier for a second communication session on the second messaging channel associated with the second message provider; and providing a second messaging interface at the user device for the second messaging channel.

2. The system of claim 1, wherein determining the intent of the user includes analyzing a next best action and a success rate of servicing the intent.

3. The system of claim 1, wherein the operations further comprise:

providing, to the user at the user device, a messaging channel recommendation for a third messaging channel, based on the interaction of the user with the second messaging channel;

receiving an input initiating a third communication session via the third messaging channel; and transferring, based on the received input, information regarding previous user interactions with the second messaging channel to the third messaging channel.

4. The system of claim 1, wherein the system includes a mid-tier messaging system.

5. The system of claim 1, wherein the received request includes a request to login with a service provider system, and in response to the received request, an authorization code is generated from an authorization to an account used to access the first messaging channel.

6. The system of claim 5, wherein the operations further comprise:

providing the authorization code to the second message provider associated with the second messaging channel.

7. The system of claim 1, wherein the operations further comprise:

normalizing message communications to have compatible data formats between the first messaging channel and the second messaging channel.

8. A method comprising:

receiving a request to initiate a first communication session via a first messaging interface of a first message provider associated with a first messaging channel with a user device;

establishing, based on the received request, a mid-tier session that includes a mid-tier session identifier that is mapped to a first communication session identifier for the first communication session and a user identifier associated with a user of the user device;

determining, based in part on an interaction of the user with the first messaging channel of the first message provider during the first communication session, an intent of the user associated with the user device;

determining that a second messaging channel associated with a second message provider is available to satisfy the intent of the user based on at least one predetermined threshold condition;

mapping the mid-tier session identifier to a second communication session identifier fora second communication session on the second messaging channel associated with the second message provider; and providing a second messaging interface at the user device for the second messaging channel.

9. The method of claim 8, wherein determining the intent of the user includes analyzing a next best action and a success rate of servicing the intent.

10. The method of claim 8, further comprising:

providing, to the user at the user device, a messaging channel recommendation for a third messaging channel, based on the interaction of the user with the second messaging channel;

receiving an input initiating a third communication session via the third messaging channel; and transferring, based on the received input, information regarding previous user interactions with the second messaging channel to the third messaging channel.

11. The method of claim 8, wherein the mid-tier session is established by a mid-tier messaging system.

12. The method of claim 8, wherein the received request includes a request to login with a service provider system, and in response to the received request, an authorization code is generated from an authorization to an account used to access the first messaging channel.

13. The method of claim 12, further comprising:

providing the authorization code to the second message provider associated with the second messaging channel.

14. The method of claim 8, further comprising normalizing message communications to have compatible data formats between the first messaging channel and the second messaging channel.

15. A non-transitory machine-readable medium having stored thereon machine-readable instructions executable to cause a machine to perform operations comprising:

receiving a request to initiate a first communication session via a first messaging interface of a first message provider associated with a first messaging channel with a user device;

establishing, based on the received request, a mid-tier session that includes a mid-tier session identifier that is mapped to a first communication session identifier for the first communication session and a user identifier associated with a user of the user device;

determining, based in part on an interaction of the user with the first messaging channel of the first message provider during the first communication session, an intent of the user associated with the user device;

determining that a second messaging channel associated with a second message provider is available to satisfy the intent of the user based on at least one predetermined threshold condition;

mapping the mid-tier session identifier to a second communication session identifier fora second communication session on the second messaging channel associated with the second message provider; and providing a second messaging interface at the user device for the second messaging channel.

16. The non-transitory machine-readable medium of claim 15, wherein determining the intent of the user includes analyzing a next best action and a success rate of servicing the intent.

17. The non-transitory machine-readable medium of claim 15, wherein the operations further comprise:

providing, to the user at the user device, a messaging channel recommendation for a third messaging channel, based on the interaction of the user with the second messaging channel;

receiving an input initiating a third communication session via the third messaging channel; and transferring, based on the received input, information regarding previous user interactions with the second messaging channel to the third messaging channel.

18. The non-transitory machine-readable medium of claim 15, wherein the mid-tier session is established by a mid-tier messaging system.

19. The non-transitory machine-readable medium of claim 15, wherein the received request includes a request to login with a service provider system, and in response to the received request, an authorization code is generated from an authorization to an account used to access the first messaging channel.

20. The non-transitory machine-readable medium of claim 19, wherein the operations further comprise:

providing the authorization code to the second message provider associated with the second messaging channel.

* * * * *

UNITED STATES PATENT AND TRADEMARK OFFICE
CERTIFICATE OF CORRECTION

| | |
|---|---|
| PATENT NO. | : 11,533,287 B2 |
| APPLICATION NO. | : 17/165871 |
| DATED | : December 20, 2022 |
| INVENTOR(S) | : Rahul Nair et al. |

It is certified that error appears in the above-identified patent and that said Letters Patent is hereby corrected as shown below:

In the Claims

Column 25, Line 67, change "fora" to -- for a --

Column 26, Line 57, change "fora" to -- for a --

Signed and Sealed this
Twenty-first Day of February, 2023

*Katherine Kelly Vidal*
Katherine Kelly Vidal
*Director of the United States Patent and Trademark Office*